United States Patent
Baumgartner et al.

(10) Patent No.: US 7,080,011 B2
(45) Date of Patent: Jul. 18, 2006

(54) SPEECH LABEL ACCELERATORS AND TECHNIQUES FOR USING SAME

(75) Inventors: Yoanna Baumgartner, Austin, TX (US); Gary Dale Carpenter, Pflugerville, TX (US); Brian E. D. Kingsbury, Courtland Manor, NY (US); Harry Printz, San Francisco, CA (US); Richard Siegmund, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 924 days.

(21) Appl. No.: 09/920,900

(22) Filed: Aug. 2, 2001

(65) Prior Publication Data

US 2002/0049582 A1    Apr. 25, 2002

Related U.S. Application Data

(60) Provisional application No. 60/222,819, filed on Aug. 4, 2000.

(51) Int. Cl.
*G10L 15/00* (2006.01)
(52) U.S. Cl. ..................... 704/231; 704/235
(58) Field of Classification Search ............. 704/231, 704/255
See application file for complete search history.

(56) References Cited

U.S. PATENT DOCUMENTS

| | | | | |
|---|---|---|---|---|
| 4,481,593 A | * | 11/1984 | Bahler | 704/253 |
| 4,489,435 A | * | 12/1984 | Moshier | 704/244 |
| 4,718,094 A | * | 1/1988 | Bahl et al. | 704/240 |
| 5,148,489 A | * | 9/1992 | Erell et al. | 704/226 |
| 5,280,562 A | * | 1/1994 | Bahl et al. | 704/200 |
| 5,572,624 A | * | 11/1996 | Sejnoha | 704/256 |
| 6,023,673 A | | 2/2000 | Bakis et al. | 704/231 |
| 6,224,636 B1 | * | 5/2001 | Wegmann et al. | 704/246 |
| 6,260,013 B1 | * | 7/2001 | Sejnoha | 704/240 |
| 6,374,216 B1 | * | 4/2002 | Micchelli et al. | 704/236 |
| 6,539,351 B1 | * | 3/2003 | Chen et al. | 704/236 |
| 6,678,658 B1 | * | 1/2004 | Hogden et al. | 704/243 |

* cited by examiner

*Primary Examiner*—Richemond Dorvil
*Assistant Examiner*—Michael N. Opsasnick
(74) *Attorney, Agent, or Firm*—Ryan, Mason & Lewis, LLP

(57) ABSTRACT

Speech Label Accelerators (SLAs) are provided that comprise an indirect memory, atom value memory, and adder circuitry. Optionally, the SLAs also comprise an accumulator, a load/accumulate multiplexer (mux), and a control unit. There are a variety of different configurations for the adder circuitry, and a configuration can be selected based on speed, power, and area requirements. A number of techniques are provided that allow a system having an SLA to handle more dimensions, atoms, or both than the SLA was originally designed for. A "zig-zag" method is provided that speeds processing in a system when using more dimensions than the SLA was originally designed for. Generally, the kernels used by the SLA will be Gaussian and separable, but non-Gaussian kernels and partially separable kernels may also be used by the SLA.

44 Claims, 23 Drawing Sheets

| g1 | g2 | g3 | g4 | g5 | g6 | g7 | g8 |
|----|----|----|----|----|----|----|----|
| 1  | 1  | 0  | 0  | 1  | 1  | 1  | 0  |
| 0  | 1  | 1  | 0  | 1  | 1  | 1  | 1  |
| 1  | 1  | 0  | 1  | 0  | 1  | 1  | 1  |
| 0  | 0  | 1  | 0  | 1  | 0  | 1  | 0  |
| 0  | 1  | 1  | 0  | 1  | 0  | 1  | 0  |
| 1  | 0  | 1  | 1  | 1  | 1  | 1  | 1  |
| 0  | 1  | 0  | 1  | 1  | 1  | 0  | 0  |
| 1  | 0  | 0  | 1  | 1  | 0  | 0  | 0  |
| 0  | 0  | 0  | 1  | 1  | 1  | 0  | 0  |

420

| $a_0(v)$ | $a_1(v)$ |
|----------|----------|
| -0.01    | 2.11     |
| 5.12     | -1.02    |
| 3.70     | 1.44     |
| -1.20    | 0.37     |
| 2.28     | 1.00     |
| -1.36    | 0.87     |
| -0.78    | 1.73     |
| 3.25     | 2.61     |
| -0.94    | 6.20     |
| 3.40     | -7.31    |

430

| 14.91 | 20.63 | 12.35 | 8.22 | 11.54 | 0.57 | 12.21 | 6.93 |

FIG. 6

| EXPRESSION | MEANING | TYPICAL |
|---|---|---|
| $A$ | ATOMS PER DIMENSION | 64 |
| $b$ | BITS TO REPRESENT AN ATOM VALUE | 32 |
| $d$ | DIMENSIONS IN THE MODEL | 40 |
| $r = \lceil \log_2 A \rceil$ | BITS TO RECORD AN ATOM INDEX | 6 |
| $N_g$ | GAUSSIANS PROCESSED PER INDIRECT MEMORY LOAD | 32 |
| $T_g$ | TOTAL GAUSSIANS ACCUMULATED | 640 |

| EXPRESSION | MEANING | TYPICAL |
|---|---|---|
| $A$ | ATOMS PER DIMENSION | 64 |
| $b$ | BITS TO REPRESENT AN ATOM VALUE | 32 |
| $d$ | HARDWARE DIMENSIONS IN MODEL | 10 |
| $D = kd$ | TRUE DIMENSIONS IN MODEL | 40 |
| $H$ | LEVELS OF HIERARCHY | 3 |

FIG. 22

| EXPRESSION | MEANING | TYPICAL |
|---|---|---|
| $r = \lceil \log_2 A \rceil$ | BITS TO RECORD AN ATOM INDEX | 6 |
| $d$ | HARDWARE DIMENSIONS IN MODEL | 10 |
| $D = kd$ | TRUE DIMENSIONS IN MODEL | 40 |
| $G$ | GAUSSIANS COMPUTED PER FRAME | 1152 = 128 x (1 + 3 + 5) |

FIG. 23

| EXPRESSION | MEANING | TYPICAL |
|---|---|---|
| $b$ | BITS TO REPRESENT AN ATOM VALUE | 32 |
| $G$ | GAUSSIANS COMPUTED PER FRAME | 1152 = 128 x (1 + 3 + 5) |

# SPEECH LABEL ACCELERATORS AND TECHNIQUES FOR USING SAME

CROSS REFERENCE TO RELATED APPLICATIONS

This application claims the benefit of U.S. Provisional Application No. 60/222,819, filed Aug. 4, 2000.

FIELD OF THE INVENTION

The present invention relates to speech recognition and, more particularly, to Speech Label Accelerators (SLAs) and techniques for using such SLAs.

BACKGROUND OF THE INVENTION

Speech recognition, in which speech is translated to text, is currently a computationally intensive task. Additionally, much of the recognition is performed in software. For a personal computer or a workstation, recognition of the speech of a single person generally does not adversely affect the operation of the computer. This is true because the person usually has only the speech recognition system running, along with perhaps a word processor. Moreover, current processors are quite fast and memory is relatively inexpensive.

However, for some systems, such as a Personal Digital Assistant (PDA), speech recognition is problematic. Similar devices include other small, hand-held devices and set-top boxes. These devices generally do not contain enough processing power to run a speech recognizer and other software. Consequently, speech recognition is relatively unused on these devices.

Another system that can have problems with speech recognition is a large-scale recognition system. In this type of system, multiple utterances from different speakers are translated to text simultaneously. While it is possible to purchase larger and faster systems in order to help translate this amount of speech, it would be beneficial to reduce the load on the processors of the system when the system performs speech recognition. The latter would allow the system to use the extra processing power on other tasks or to accommodate additional simultaneous speakers.

Consequently, a need exists for techniques to reduce the computational load of a processor during speech recognition.

SUMMARY OF THE INVENTION

The present invention provides Speech Label Accelerators (SLAs) and techniques for using such SLAs. The present invention speeds processing during the labeling stage of a speech recognizer and frees one or more processors from performing labeling.

Broadly, Speech Label Accelerators (SLAs) are provided that comprise an indirect memory, atom value memory, and adder circuitry. Optionally, the SLAs also comprise an accumulator, a load/accumulate multiplexer (mux), and a control unit. As explained in more detail below, the indirect memory acts to select atom values from the atom value memory. The atoms are added to determine an approximate value for a kernel or the logarithm of a kernel. Consequently, the SLA allows fast and efficient computation of kernels. The kernels may be subsequently used to determine leaf values, which are then used to determine a word or phrase for a segment of speech.

There are a variety of different configurations for the adder circuitry, and a configuration can be selected based on bandwidth, latency, power, and area requirements. Additionally, a number of techniques are provided that allow a system having an SLA to handle more dimensions, atoms, or both, than the SLA was originally designed for. Moreover, a "zig-zag" method is provided that speeds processing in a system when using more dimensions than the SLA was originally designed for. Generally, the kernels used by the SLA will be Gaussian and separable, but non-Gaussian kernels and partially separable kernels may also be used by the SLA.

A more complete understanding of the present invention, as well as further features and advantages of the present invention, will be obtained by reference to the following detailed description and drawings.

BRIEF DESCRIPTION OF THE DRAWINGS

FIG. 4 is a block diagram of a memory illustrating exemplary indirect memory, atom value memory, and accumulator memory, in accordance with one embodiment of the present invention;

FIG. 6 is a table of exemplary values for variables shown in FIG. 5;

FIGS. 21 through 23 are tables of exemplary expressions, which are used to determine potential load on a system bus for an exemplary SLA, in accordance with one embodiment of the present invention;

DETAILED DESCRIPTION OF PREFERRED EMBODIMENTS

As previously discussed, the Speech Label Accelerators (SLAs) of the present invention speed the labeling phase of the speech recognition computation. Due to the length of the discussion here, a number of headings are used for readability purposes. The headings should not be considered limiting in any way.

1. Introduction

The organization of this document is as follows. Section 2 begins with a review of concepts and notation, and also describes the mathematical task that comprises labeling. Here, the key characteristic of separability, which a function should exhibit for the present invention to apply, is identified. In Section 3, the basic theory behind the invention is explained, and it is shown how the invention exploits separability. Then in Section 4, it is shown how the techniques of the previous sections may be designed as an apparatus. This section includes a discussion of the wide variety of hardware designs that are possible for the same basic idea. In Section 5, various extensions and refinements are described. In Section 6, a variety of practical issues, such as interaction with a speech recognition system and the load that the SLA places on a system bus, are discussed.

2. Fundamentals 2.1 Basic Definitions and Notation

Figure 1:
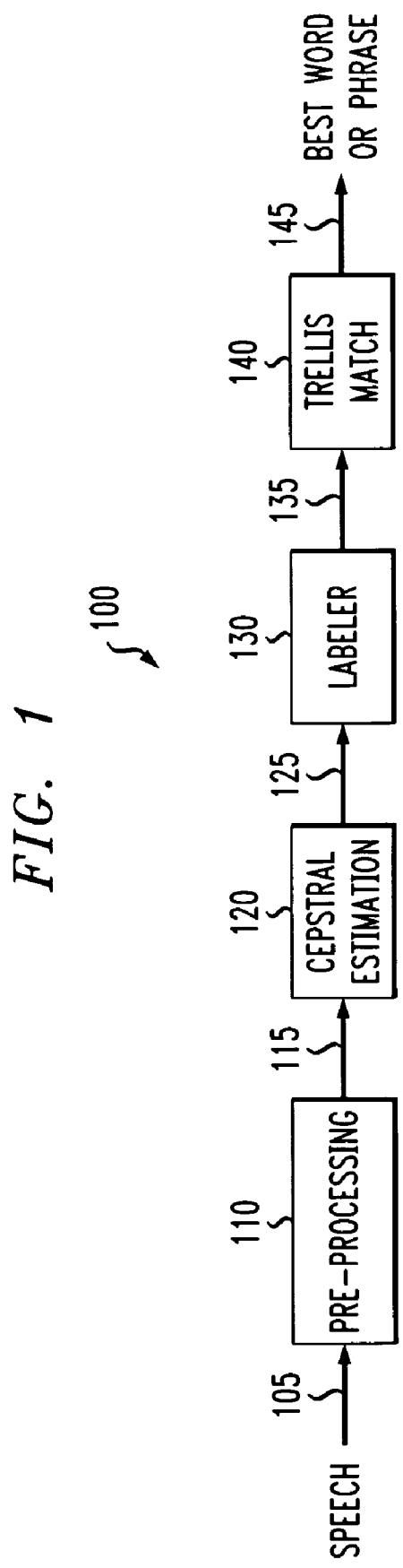
FIG. 1 shows an exemplary system for converting speech to text.

Turning now to FIG. 1, an exemplary speech recognition system 100 is shown. Speech recognition system 100 operates on a speech signal 105 to produce a best word or phrase 145. System 100 comprises a pre-processing block 110, a cepstral estimation block 120, a labeler 130, and a trellis match block 140.

Let s(t) represent a continuous-time, continuous-amplitude audio signal 105, which is assumed to contain some speech that is to be decoded into text. Let this signal be quantized in time and in amplitude by pre-processing block 110, yielding a sequence of samples denoted $s_0, s_1, \ldots, s_i$. In the first stage of the speech recognition computation, this stream of samples is divided into equal-sized, overlapping blocks of contiguous samples. Each block is called a frame. A typical frame contains 256 samples. Thus, signal 115 is a series of overlapping frames. Those skilled in the art will realize that, to convert the speech signal 105 into frames 115, the pre-processing block 110 can contain such devices as an analog-to-digital converter, a window/filter, and a Fast Fourier Transform.

By applying selected signal-processing operations, for instance, mel-frequency cepstral estimation 120, each frame from signal 115 is converted into an observation vector. Signal 125 comprises a series of observation vectors. The relation between frames and observation vectors is one-to-one. The sequence of frames 115 is written as $x_0, x_1, \ldots x_j$, and the associated sequence of observation vectors 125 is written as $v_0, v_1, \ldots v_j$. The SLA operates on this sequence of observation vectors, one vector at a time. The SLA performs the work of labeling block 130. The labeling block 130 performs a computation that is discussed below and determines probabilities 135 for a number of phones. Phones are small, indivisible acoustic elements of speech. Trellis match 140 then performs a search and selects a best word or phrase 145. Now that an overall system has been described, SLA 130 will be described in more detail.

Each observation vector $v_j$ contains some fixed number of elements. Call this number d, short for "dimension," which is a common term used to describe this number. A typical value for d is 40.

In speech recognition parlance, an acoustic model is a set of d-dimensional probability density functions or pdfs, hereafter $M = \{P(\cdot|l)\}_{l=1}^{L}$. Each such pdf is typically implemented as a mixture of d-dimensional Gaussians, thus $$P(\cdot|l) = w_1 g_{l1}(\cdot) + w_2 g_{l2}(\cdot) + \ldots + w_n g_{ln}(\cdot) \qquad (1)$$

with $$\sum_{i=1}^{n_l} w_i = 1, \; w_i \geq 0. \qquad (2)$$

Here $g_{lj}(\cdot)$ is the jth Gaussian of pdf l, and there are all together $n_l$ Gaussians in the lth pdf. When $P(\cdot|l)$ has the form given by Equations (1) and (2), it is typically called a Gaussian Mixture Model (GMM). The function $P(\cdot|l)$ is sometimes also called a leaf, because such functions are distributed among the leaves of a family of decision trees.

The computation that the SLA speeds up (or in fact approximates, by a procedure detailed below) is the following. Given a single observation vector, v, associated with a single frame of speech, the top-ranking K leaves $l_1, l_2, \ldots l_k$ in the set M are to be determined, as ordered by the likelihoods $\{P(v|l)\}_{l=1}^{L}$. Although in principle this involves computing the value of all L leaves present in the acoustic model M, in fact a hierarchical scheme, which is described below in Section 5.3, makes it possible to compute just a subset of leaf values. In any event, the heart of the SLA is a circuit that permits the fast approximate computation of a large collection of values $P = \{P(v|l)\}$ for a fixed observation vector v.

To understand the invention, it is necessary to have some additional detail on the structure of each Gaussian $g_{lj}(\cdot)$. Specifically, in order to apply the invention, each Gaussian should at least partially satisfy a condition that is referred to as "separability" herein. This condition is defined in Section 2.2, and then it is shown in Section 2.3 that a useful subclass of Gaussians (or rather their logarithms) is separable. In fact, any multivariate probability density function that is separable or partially separable may be treated by the speech label accelerator. A few visual examples are given in Section 2.4 to illustrate functions that are separable and not separable (but might be partially separable).

2.2 Separability: Definition

The definition of separability is as follows. Let $f$ be a function from $R^d$ to R. Consider a fixed observation vector $v \in R^d$, and let the elements of the observation vector be $v_0, v_1, \ldots, v_{d-1}$. (Note that the index here denotes different elements of the single observation vector v, and not the sequence of observation vectors discussed above.) It is said that the function $f(v)$ is "completely separable" (or more simply, just "separable") if there exist d individual functions $f_0, f_1, \ldots, f_{d-1}$, each a map from R to R, such that $$f(v) = f_0(v_0) + \ldots f_{d-1} \quad (3)$$

The word "completely" denotes the decomposition of $f$ into d distinct functions, each depending upon a single element of v. The individual functions $f_0 \ldots f_{d-1}$ will be called "splitting functions of $f$" herein, or just "splitting functions" for short.

Later on, it will be shown that a less restrictive condition, called partial separability, may also be exploited by the SLA, though to a lesser extent. This is discussed in Section 5.4 below.

2.3 Separability: Mathematical Example

As is now demonstrated, the function $\log g_{ij}(\cdot)$ is separable, providing that the covariance matrix of $g_{ij}(\cdot)$ is diagonal. To see this, write $g(v)$ for $g_{ij}(v)$, and recall that the general form of a d-dimensional Gaussian $g(v)$ is:

$$g(v) = \frac{1}{(2\pi)^{d/2}|\Sigma|^{1/2}} e^{-\frac{1}{2}(v-\mu)^T \Sigma^{-1}(v-\mu)}, \quad (4)$$

where $\mu$ is the d-dimensional mean vector of th Gaussian, and $\Sigma$ is its d×d covariance matrix.

Suppose now that $\Sigma$ is diagonal, that is $$\Sigma = \begin{bmatrix} \sigma_1^2 & & & \\ & \sigma_2^2 & & \\ & & \ddots & \\ & & & \sigma_d^2 \end{bmatrix} \quad (5)$$

where empty elements are zeros. Recalling that the determinant of a diagonal matrix is the product of the diagonal elements, Equation (4) may be written as:

$$g(v) = \frac{1}{(2\pi)^{d/2}\sigma_1 \cdots \sigma_d} \exp -\frac{1}{2}\left(\left(\frac{v_1-\mu_1}{\sigma_1}\right)^2 + \cdots + \left(\frac{v_d-\mu_d}{\sigma_d}\right)^2\right). \quad (6)$$

It follows then that $$\log g(v) = \quad (7)$$
$$-\frac{1}{2}\left(\frac{v_1-\mu_1}{\sigma_1}\right)^2 - \log\sqrt{2\pi}\,\sigma_1 - \cdots - \frac{1}{2}\left(\frac{v_d-\mu_d}{\sigma_d}\right)^2 - \log\sqrt{2\pi}\,\sigma_d.$$

It is clear then that by defining the family of functions $$f_i(x) = -\frac{1}{2}\left(\frac{x_i-\mu_i}{\sigma_i}\right)^2 - \log\sqrt{2\pi}\,\sigma_i \quad (8)$$

for $i=1, \ldots, d$ that the decomposition required to fulfill Equation (3) above has been demonstrated.

2.4 Separability: Visual Examples

Figure 2:
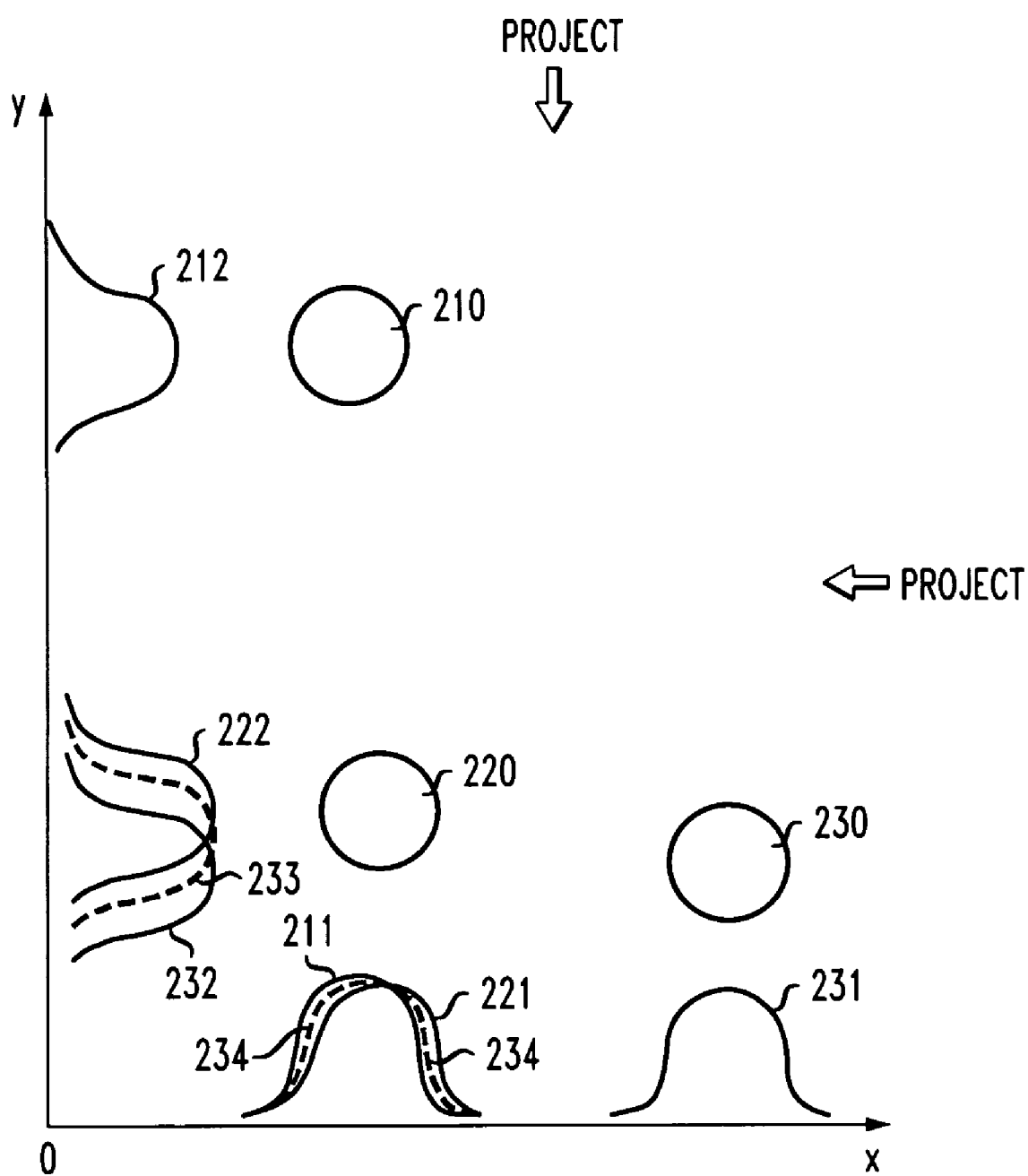
FIG. 2 shows a graph illustrating several two-dimensional Gaussian probability density functions (pdfs), used to illustrate separability.

Separability may also be visually explained. Turning to FIG. 2, a graph is shown of three representations 210, 220, and 230 of two-dimensional Gaussian pdfs. These representations 210, 220, and 230 are basically contour lines of two-dimensional Gaussian pdfs, where the contour lines are chosen at approximately the variances of the two-dimensional pdfs. Projecting these two-dimensional pdfs onto the X plane results in a one-dimensional pdf 211 that corresponds to representation 210, a one-dimensional pdf 221 that corresponds to representation 220, and a one-dimensional pdf 231 that corresponds to representation 230. Similarly, projecting these two-dimensional pdfs onto the Y plane results in a one-dimensional pdf 212 that corresponds to representation 210, a one-dimensional pdf 222 that corresponds to representation 220, and a one-dimensional pdf 232 that corresponds to representation 230.

The two-dimensional pdfs that form representations 210, 220, and 230 are separable because these two-dimensional pdfs can be separated into one-dimensional pdfs on the X and Y planes, and the one-dimensional pdfs from the X and Y planes can be used to reconstruct the original two-dimensional pdfs. For example, if one multiplies one-dimensional pdf 211 by one-dimensional pdf 212, the original two-dimensional pdf (as illustrated by representation 210) results. The pdfs 233 and 234 are discussed below.

Figure 3:
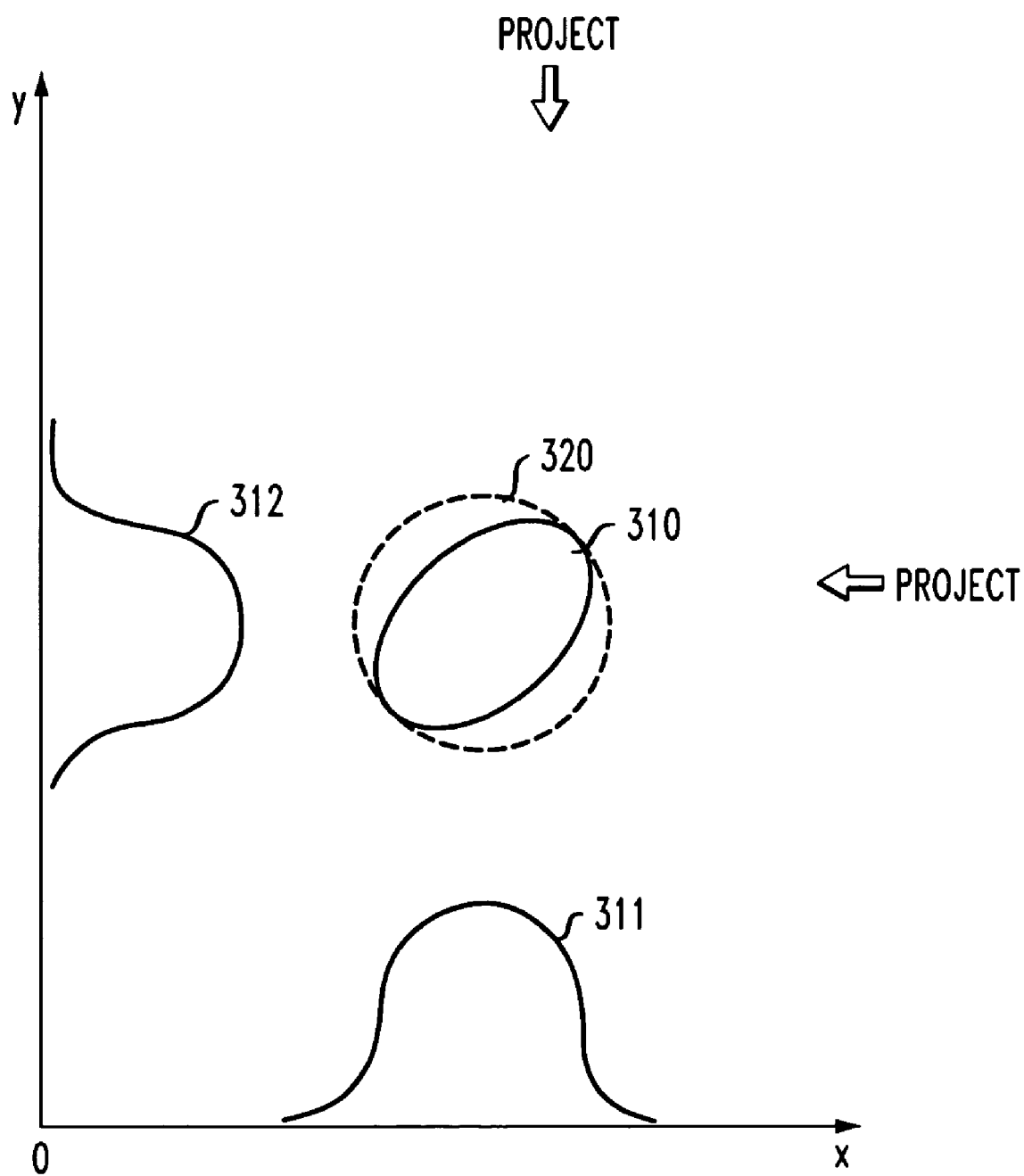
FIG. 3 shows a graph illustrating a two-dimensional Gaussian pdf, used to illustrate separability.

FIG. 3 shows a graph having a representation 310 of a two-dimensional pdf. As before, representation 310 is basically a contour line of a two-dimensional Gaussian pdf, where the contour line is chosen at approximately the variance of the two-dimensional pdf. When the two-dimensional Gaussian pdf is projected onto the X axis, one-dimensional Gaussian pdf 311 results, and when the two-dimensional Gaussian pdf is projected onto the Y axis, one-dimensional Gaussian pdf 312 results. However, when the two one-dimensional pdfs 311 and 312 are multiplied, a two-dimensional Gaussian pdf represented by representation 320 is formed. As can be seen, the representation 320 is different than representation 310, which means that the two two-dimensional Gaussian pdfs are different. This means that the two-dimensional Gaussian pdf represented by representation 310 is not separable.

However, it might be possible that the two-dimensional Gaussian pdf represented by representation 310 could be part of a ten-dimensional, for example, partially separable Gaussian pdf. In the latter situation, the ten-dimensional Gaussian pdf could be separated into five two-dimensional Gaussian pdfs (similar to the two-dimensional Gaussian pdf represented by representation 310) that can then be used to reconstruct the original ten-dimensional Gaussian pdf. While the ten-dimensional Gaussian pdf is not completely separable, in that it cannot be separated into ten functions that can be multiplied to recreate the original ten-dimensional Gaussian pdf, it is partially separable, in that it can be separated into five functions that can be multiplied to recreate the original ten-dimensional Gaussian pdf.

It should be noted that separability is not limited to Gaussian pdfs.

3. Theory of Atoms and Their Use

Consider once again the model M. As defined above, this is a large collection of pdfs, where each pdf is expressed as a mixture of Gaussians. For now, it is assumed that each Gaussian is diagonal, and therefore completely separable.

However, the present invention applies to the more general case of any completely separable function, which is hereafter referred to as a "log kernel." To interpret the text below in its full generality, the word "Gaussian" below may be replaced by "kernel." Moreover, as discussed below, the present invention applies to partially separable functions.

3.1 Basis

It is implicit from Equation (1) that each Gaussian $g_{lj}$ is assimilated to a particular pdf $P(\cdot|l)$, but for the moment this is ignored. Also, from now on, both the function $g_{lj}(\cdot)$ (i.e., a "kernel") and its logarithm log $g_{lj}(\cdot)$ (i.e., a "log kernel") will be referred to as a "Gaussian," though of course this is true only of the former. It will be clear from context what is meant.

Consider the set $$L=\{ \log g_{lj} | \text{for } l=1, \ldots, L, \text{ with } j=1, \ldots, n_l\} \quad (9)$$

of all Gaussians appearing in any pdf of the model M. Ignoring the association between Gaussians and specific leaves, this set may be more simply written as $$L=\{ \log g_j | \text{for } j=1, \ldots, M\},$$

where $$M = \sum_{l=1}^{L} n_l$$

is the total number of Gaussians in the model M. Note that any given log $g_j$ splits into functions $f_{j,i}$ for $i=0, \ldots, d-1$. The function $f_{j,i}$ may be referred to as the ith component of log $g_j$, where $f_{j,i}$ is defined in the obvious way according to Equation (8), with $\mu_{j,i}$ replacing $\mu_j$ and $\sigma_{j,i}$ replacing $\sigma_j$. That is, $\mu_{j,i}$ is the ith component of the mean vector $\mu_j$ assimilated to $g_j$, and likewise for $\sigma_{j,i}$. What will be demonstrated is an easy way to compute an estimate of every function in L, for a given fixed observation vector v.

By the earlier argument, each function in L is completely separable. Define a collection of d sets $L_0, \ldots, L_{d-1}$ as follows: $L_i$ is the collection of all ith components of all functions appearing in L. Thus, $L_i=\{f_{j,i}\}_{j=1}^{M}$. Now a key empirical observation may be made. This key observation is that, in general, for large collections of Gaussian mixtures like M, the number of distinct $<\mu_{j,i}, \sigma_{j,i}>$ value pairs appearing in the functions of L is relatively small, even when the total number of distinct Gaussians in M is large. Moreover, even if the exact values of the multitude of $<\mu_{j,i}, v_{j,i}>$ values are distinct, to a good approximation they can be represented by a relatively small number of values. For instance, it has been empirically observed that for an acoustic model M containing tens of thousands or even hundreds of thousands of Gaussians, it suffices to have no more than 64 representatives per dimension.

An example will make this more clear. Suppose a model consists of eight Gaussians. Fix a particular dimension i of interest, and write down the $<\mu,\sigma>$ value pairs for the ith component of the eight log Gaussians. Suppose they are as follows:

| μ values | 0.1 | 2.5 | 0.0 | 2.5 | 0.1 | 2.4 | 2.4 | 2.5 |
| σ values | 3.3 | 1.1 | 3.0 | 1.0 | 3.1 | 1.2 | 1.0 | 1.2 |
| atom index | 1 | 2 | 1 | 2 | 1 | 2 | 2 | 2 |

(The last line of this table will be explained momentarily.) Looking at these numbers, the intuition is strong that only two $<\mu,\sigma>$ value pairs are required to represent the eight distinct log Gaussians. These are respectively $<0.0,3.0>$ and $<2.5,1.0>$. These are called the atoms for the given dimension i, and name them atom 0 and atom 1, or $a_{i0}$ and $a_{i1}$ respectively. The association between a given exact $<v,\sigma>$ value pair, and the atom that best represents it, is given in the third row "atom index" above. Note that this association depends only upon the μ and σ parameters of the elements of $L_i$; the value of any observation vector has not even been considered in this discussion.

It is now explained why this is of value in this computation. Assume that a fixed collection of atoms $<\tilde{\mu}_{1i}, \sigma_{li}>, \ldots, <\tilde{\mu}_{Ai}, \sigma_{Ai}>$ has been chosen in each dimension. Consider a given observation vector v, and suppose that it is desirable to compute the value of every function in L at v, which is to say $\{\log g_{lj}(v) | \text{for } l=1, \ldots, L, j=1, \ldots, n_l\}$. To a good approximation, this computation may be performed as follows.

First, determine the value of each atom in each dimension. Note that by virtue of the definition of separability, the atoms of dimension i depend only upon the value of $v_i$. Thus, the following occurs $$a_{i0}(v_i) = -\frac{1}{2}\left(\frac{v_i - 0.0}{3.0}\right)^2 - \log(\sqrt{2\pi} \times 3.0) \quad (11)$$

$$a_{i1}(v_i) = -\frac{1}{2}\left(\frac{v_i - 2.5}{1.0}\right)^2 - \log(\sqrt{2\pi} \times 1.0). \quad (12)$$

This step is referred to herein as an atom value computation.

Atoms may also be suitably described through reference to a diagram. Returning to FIG. 2, this figure shows two one-dimensional pdfs 211 and 221 that are projections on the X axis of two-dimensional pdfs illustrated by representations 210 and 220, respectively. It can be seen that the two pdfs 211 and 221 are very similar. It could be that pdf 211 would be chosen as an atom to describe pdf 221. It can be seen that there will be some error when using atom 211 to calculate values associated with pdf 221. However, the error should be small.

It should be noted that there are a variety of techniques for determining atoms. While an existing pdf may be used as an atom, averaging or other mathematical techniques may be used to determine atoms. Atoms are described in U.S. Pat. No. 5,280,562, entitled "Speech Coding Apparatus with Single-Dimension Acoustic Prototypes for a Speech Recognizer," issued Jan. 18, 1994, the disclosure of which is incorporated herein by reference. Thus, pdf 233 (i.e., an atom function) could be chosen as an atom to represent pdfs 22 and 232, which are kernel functions. Similarly, pdf 234 could be chosen to represent pdfs 211 and 221.

Now one is ready to determine, to an approximation, the actual values of the functions in L. Consider any one such function log $g(\cdot)$, and suppose that, as above, a set of atoms for each dimension has been determined. Also, an appropriate atom index for each dimension of the particular function log $g(\cdot)$ has been determined. Denote the list of atom indices, which are determined once for all time by the parameters associated with $g(\cdot)$, by $i_0, i_1, \ldots i_{d-1}$. Then the following results:

$$\log g(v) \approx a_{0 i_0}(v_0) + a_{1 i_1}(v_1) + \ldots + a_{d-1 i_{d-1}}(v_{d-1}), \quad (13)$$

where all the atom values have been precomputed, in the atom value computation step, and can be determined by lookup in a table. Thus the approximate computation of { log $g_j(v)|$ for $j=1, \ldots, M\}$ can be reduced to the steps of (1) computing all the atom values on v, and (2) summing the appropriate d atoms for each desired Gaussian. This approximation technique is known as the method of quantized Gaussians.

3.2 Ranking of Mixture Models

This discussion has shown how to determine an accurate approximation to log g(v). Recall that the aim is to find the top-ranking K members of $P=\{P(v|l)\}$, where each $P(v|l)$ is a mixture of Gaussians, as in Equation (1). To get to this ultimate result, one more approximation is used: assume that, to identify the top-ranking K members of P, it suffices to identify the top-ranking K products $w_j g_j(v)$, and then select the leaves that they are assimilated to by Equation (1).

To do this, in turn it suffices to rank the kernels by $\log(w_j g_j(v)) = \log w_j + \log g_j(v)$. Note that the $w_j$ are constants, and hence to incorporate it into the computation, the constant $\log w_j$ is associated with the kernel $g_j$, and this constant is added to the approximated kernel value $g_j(v)$ before the final ranking takes place. Thus Equation (13) may be revised to $$\log w_j g(v) \approx \log w_j + a_{0_{i_0}}(v_0) + \ldots + a_{d-1_{id-1}}(v_{d-1}). \quad (14)$$

In fact, the SLA hardware design example below assumes that the log $w_j$ term is accumulated by the main processor into the result of Equation (13) that emerges from the SLA. But in principle the accumulation of this summand could be performed in the SLA as well.

4. Apparatus Examples

This section describes a number of exemplary devices for determining the calculations disclosed in Section 3 above.

4.1 Basic Functional Elements

Suppose, as above, that there are eight Gaussians, each one 10-dimensional, and that there are but two atoms per dimension. To describe the operation of an approximation scheme in full, three tables are used. One table gives the association of atoms to particular Gaussians. A second table gives the values of the atoms for the particular frame in question. A third table contains the accumulated sums, corresponding to the log Gaussians.

FIG. 4 shows a memory 400 having an example of all three tables. The first table, which gives the association of atoms to particular Gaussians, is implemented as indirect memory 410. The second table, which gives the values of the atoms for the particular frame in question, is implemented as atom value memory 420. The third table, which contains the accumulated sums corresponding to the log Gaussians, is implemented as accumulator 430.

It should now be clear how to obtain the (approximation) of any given Gaussian: run down the column of atom indices associated with the selected Gaussian, and use these indices to select summands from the atom value table. The accumulated value of the summands, to a good approximation, is the logarithm of the desired Gaussian. The SLA implements these memories in hardware, with appropriate data path and control elements to carry out the computation just described.

An example helps to illustrate the usefulness of memory 400. The indirect memory 410 has, for each element, a "0" or a "1." These numbers select the particular atom, $a_0(v)$ or $a_1(v)$, respectively, associated with each atom index for a selected Gaussian. Each row of indirect memory 410 and atom value memory 420 correspond to a dimension. As an illustration, to determine the accumulated value of 6.93 for log($g_8$), the following equation is used: −0.01+−1.02+1.44+−1.20+2.28+−1.36+1.73+2.61+−0.94+3.40=6.93. In the latter equation, "−0.01," for example, is the dimension zero entry of the $a_0(v)$ atom.

A number of observations may now be made. First, it is being assumed that the same fixed number of atoms is used to represent each dimension of the model, where by "model" it is meant the complete collection of all Gaussians. This fixed number of atoms is denoted A. Then the entries in the indirect table must each be $r=\lceil \log_2 A \rceil$ bits wide. This width is fixed once for all time when the design is committed to hardware. This would seem to put a strict upper bound on the number of atoms per dimension. Second, the same applies to the overall dimensions (that is, the number of rows and columns) of the indirect memory and the accumulator, and this would seem to put a strict upper bound on the number of dimensions associated to a single Gaussian. In fact, neither of these limits is strict, and these points are discussed below in Sections 5.1 and 5.2.

Third, observe that, for the model as a whole, the association between a Gaussian and its atoms is fixed, once for all time, when the A distinct representative pairs <μ, σ> are chosen for each dimension of the space being modeled. As each new observation vector is acquired from the audio stream, only the atom values need to be recomputed. The indirect table need not change, unless it is desired to compute approximate values of a different collection of Gaussians (or process a larger number of dimensions, as detailed below).

4.2 Design Details

Figure 5:
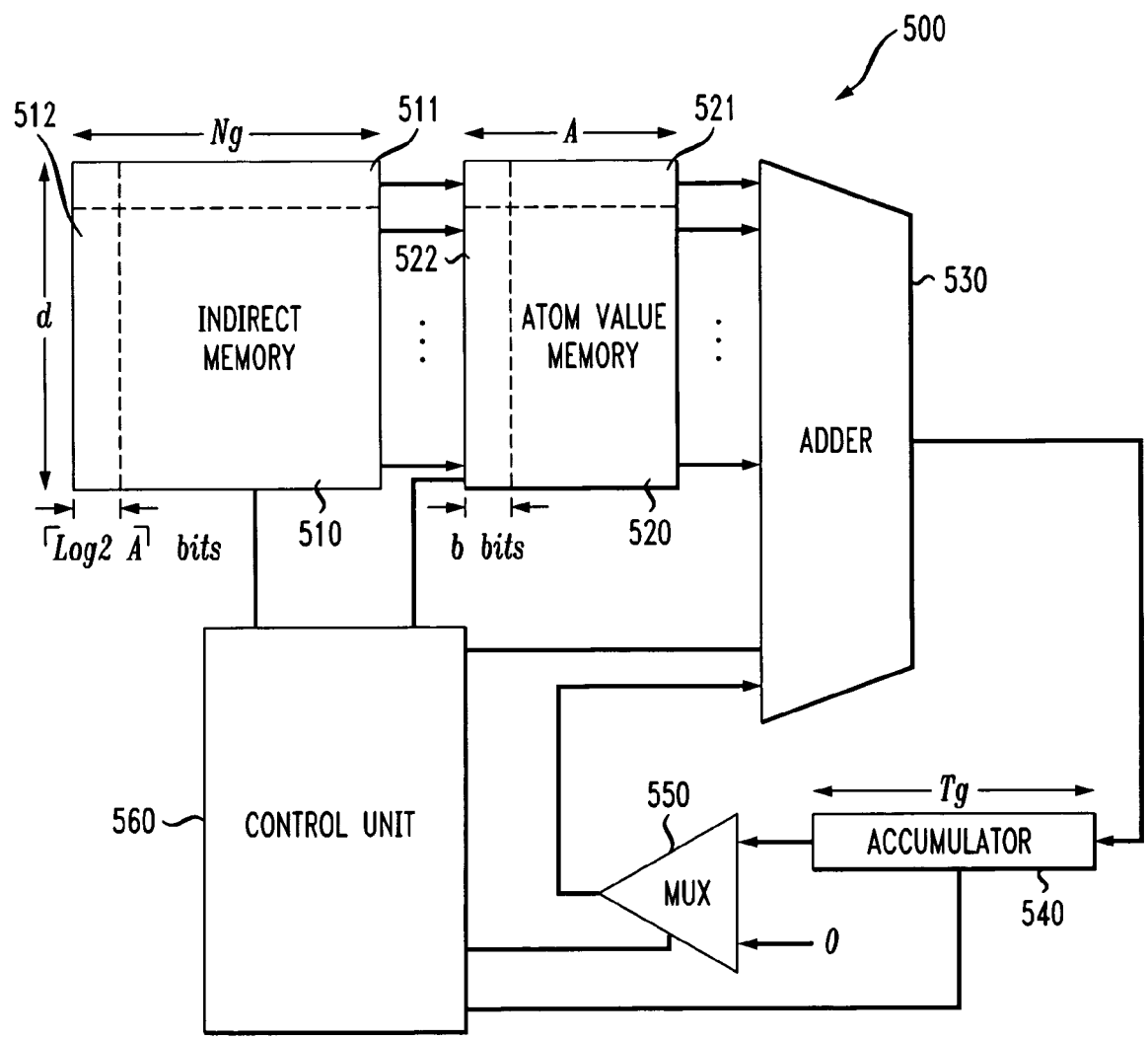
FIG. 5 is a block diagram of a Speech Label Accelerator (SLA), in accordance with one embodiment of the present invention.

In this section, exemplary designs of hardware are discussed in greater detail. FIG. 5 illustrates an SLA 500. There are six basic functional elements of the SLA 500. These are respectively (1) indirect memory 510, (2) atom value memory 520, (3) adder circuitry 530, (4) accumulator 540, (5) load/accumulate multiplexer (mux) 550, and (6) control unit 560. FIG. 5 depicts the data flow between these elements and various details of their sizes.

The control unit 560 is connected to all the other functional elements, and the indirect memory 510, atom value memory 520, and accumulator 540 are all connected to a suitable system bus (not shown), which interfaces to main system memory (not shown). This is shown in more detail below.

As in FIG. 4, indirect memory 510 comprises rows of atom indices related to particular dimensions and columns of atom indices related to particular Gaussians. For example, row 511 comprises atom indices related to the first dimension (i.e., "dimension zero") and column 512 comprises atom indices related to the first Gaussian (i.e., "Gaussian zero"). Atom value memory 520, as in FIG. 4, comprises rows of atom values related to dimensions and columns of atom values related to atoms. For instance, row 521 comprises atom values related to dimension zero, while column 522 comprises atom values related to the first set of atoms (atom zero).

Basically, indirect memory 510 is used for each Gaussian to determine which atom should be used to calculate the logarithm of that Gaussian. The appropriate value, in atom value memory 520 is added by adder 530. Accumulator 540 acts to accumulate single logarithm values or hold multiple logarithm values or both, depending on the design of adder 530. Several designs of adder 530 are discussed below.

Load/accumulate mux 550 allows the accumulator 540 to accumulate zero or forces the accumulator 540 to accumulate the result of the adder circuitry 530. FIG. 6 lists the meanings of the variables and expressions used in FIG. 5, and also lists values of the variables for common speech recognition systems.

The key variables that may be changed to obtain different designs are the degree of parallelism exhibited in the indirect memory 510 or atom value memory 520 units, and the architecture of the adder circuitry 530. There are a number of different architectures for SLA 530. Three particular architectures will now be discussed.

As drawn, the architecture 530 shows d-fold parallelism in the two memories (i.e., indirect memory 510 and atom value memory 520). Thus, in principle, the adder circuitry 530 could comprise a pipelined tree of adders, computing $\lfloor d/2 \rfloor$ sums in parallel in a first stage, $\lfloor d/4 \rfloor$ sums in parallel in a second stage, and so on until the desired result is obtained in $\lceil \log_2 d \rceil$ stages, with a final stage, if needed, to add the sum of atoms into the Accumulator. The term $\lfloor d/2 \rfloor$ is the largest integer less than d/2. For example, if there are ten dimensions, then there are four sums computed in the first stage. The final stage will be needed only if d is an integral power of two. In all other cases an earlier stage of the adder tree may be used to incorporate the previously accumulated value into the final sum. This architecture is depicted in FIG. 7.

Figure 7:
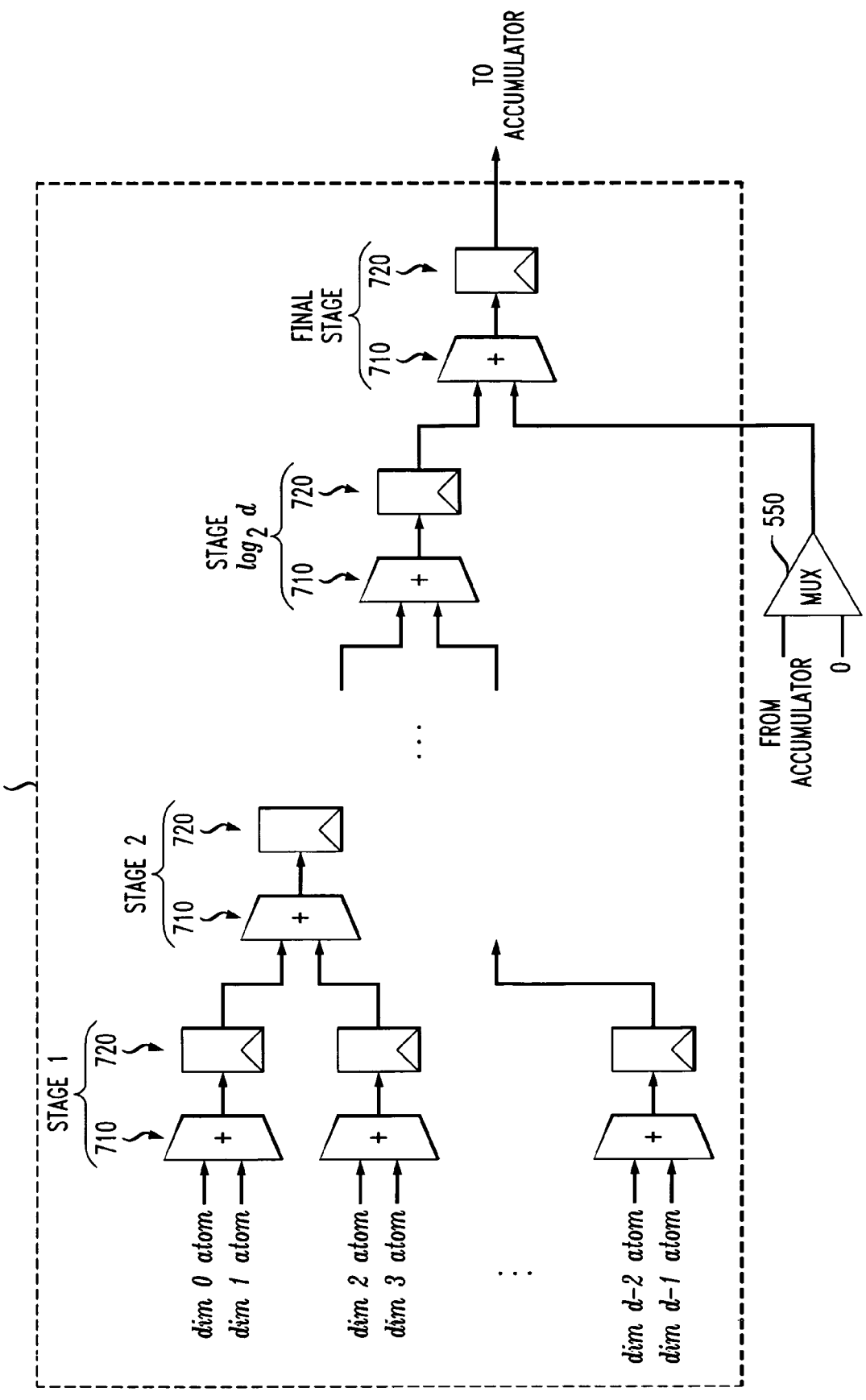
FIG. 7 is a block diagram of a pipelined tree of adders used for adder circuitry, in accordance with one embodiment of the present invention.

FIG. 7 shows adder circuitry 530 that is an adder tree comprised of stage one through stage $\log_2(d)$ and ending in the final stage. Each stage comprises a number of adders 710 and a number of registers 720. For instance, stage one comprises d/2 adders 710 and the same number of registers 720. As discussed previously, if d is an integral power of two, the final stage is not needed. For example, if d=8, the first stage will comprise four adders 710 and four registers 720, which produce the result 0+1 (i.e., the result from the addition of the dimension zero atom value, abbreviated as "0," and the dimension one atom value, abbreviated as "1"), 2+3 (i.e., addition of the dimension two atom value and the dimension three atom value), 4+5, and 6+7. The second stage produces the result of 0+1+2+3 and 4+5+6+7. The third stage ($\log_2(8)$=3) produces the result of 0+1+2+3+4+ 5+6+7. The fourth, and final, stage sums the result of 0+1+2+3+4+5+6+7 with the output of load/accumulate mux 550.

There are a variety of techniques for handling the condition where d is not an integral power of two. In the example of FIG. 7, the values that are calculated in one complete operation of adder circuitry 530 could be added to the accumulator and then added to the values that that are calculated in the second complete operation of adder circuitry 530.

For example, assume that the variable values shown in FIG. 6 (i.e., there are 40 dimensions and each atom value is represented by 32 bits) are being used. The adder circuitry 530 then comprises five stages and a final stage. The accumulator is first zeroed. The first 32 dimensions are then calculated and accumulated into the accumulator. Load/ accumulate mux 550, in this example, passes 32 bits from the accumulator to the adder 710 of the final stage. The adder circuitry 530 is then used to add the other eight dimensions, setting the 26 dimensions to zero if necessary. During the final stage, the accumulated value of the 32 dimensions is added to the newly created output of the fifth stage, thereby creating the final answer for the 40 dimensions. It should be noted that calculation of the result for 40 dimensions, with proper clock and data management, may be performed in a single cycle longer than that required to calculate the result for 32 dimensions.

Another technique for handling the condition where d is not an integral power of two is to modify adder circuitry 530 with additional adders 710 and registers 720, and thereby determine the entire d-dimensional result at once. This would, in essence, remove the need for load/accumulate mux 550. However, with load/accumulate mux 550, additional dimensions may be added to the currently existing number of dimensions in a way that is faster and involves less circuitry. Without mux 550, the previous example, involving the 32 dimension adder circuitry 520 that is used to calculate a result for 40 dimensions, would be harder to perform. The result of the first 32 dimensions would have to be added to the result of the final eight dimensions, but there is no relatively easy way to do this if there is no mux 550. Thus, mux 550 makes it easier to handle calculations for larger dimensions than for what adder circuitry 530 was originally designed.

It is also possible to implement the adder circuitry 530 as a pipelined chain of d adders, with operands emerging from the atom value memory 520 in an appropriately time-staggered fashion to feed this chain. This architecture is depicted in the series of FIGS. 8 through 13.

Figure 8:
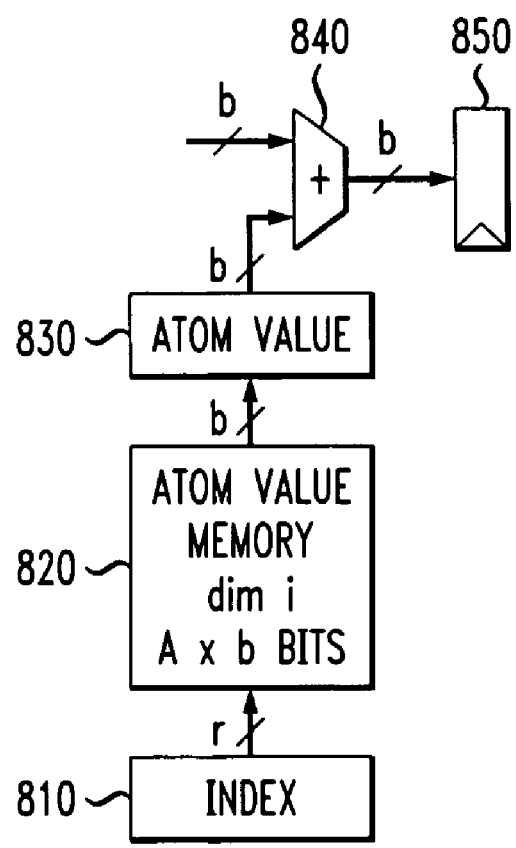
FIG. 8 is a single dimension of a pipelined adder chain, in accordance with one embodiment of the present invention.
Figure 9:
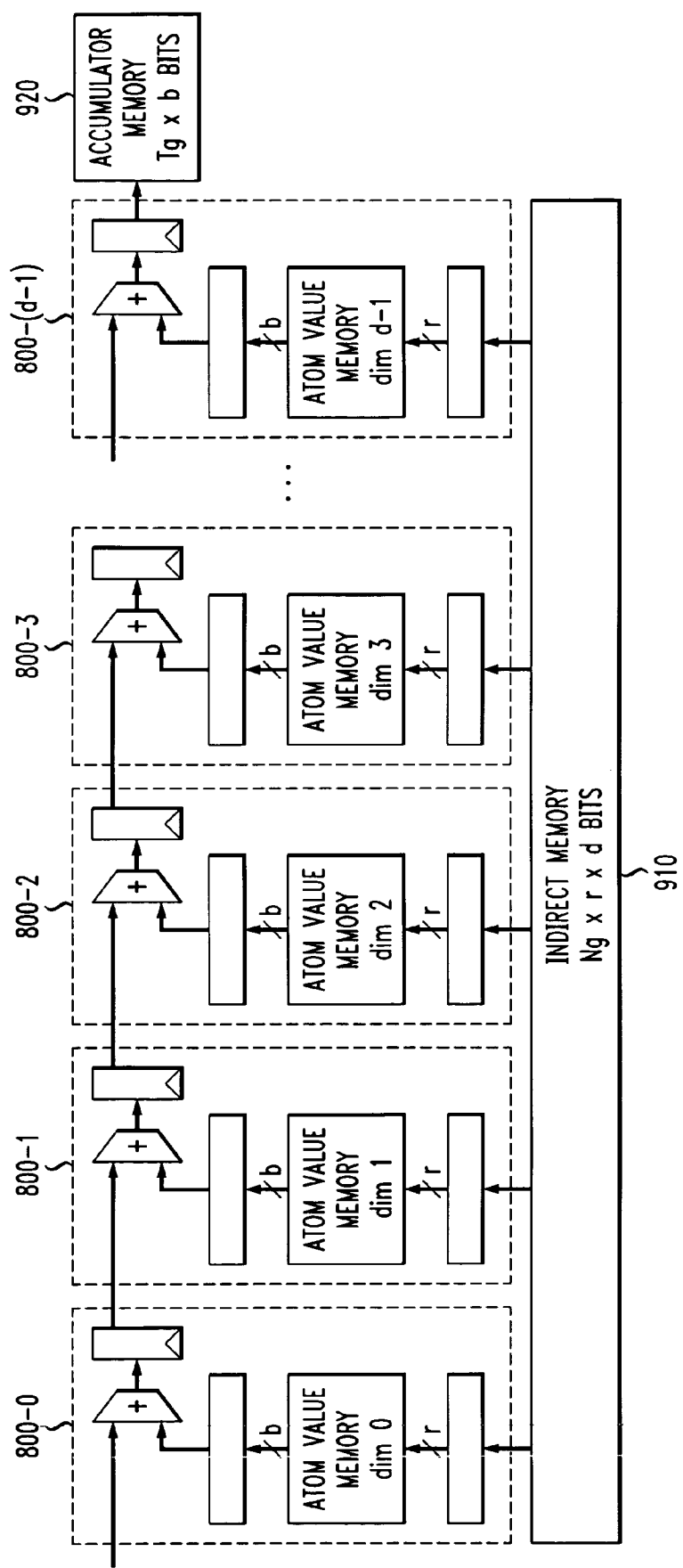
FIG. 9 is an SLA that uses multiple single dimension pipelined adder chains, as shown in FIG. 8, in accordance with one embodiment of the present invention.

FIG. 8 shows a single link 800 of a pipelined adder chain (which will be discussed in reference to FIGS. 9 through 13). Single link 800 comprises an index 810, a portion of an atom value memory 820, an atom value 830, an adder 840, and a register 850. Single link 800 basically works as follows. Index 810 is transmitted from an indirect memory, and the index 810 selects one of the A atom values in atom value memory 820, which is output as atom value 830. This atom value 830 is added to the partially accumulated log-likelihood from a previous stage (as shown in FIG. 9) by adder 840. The result is stored in register 850, and the result will be added to another atom value in the next stage (as shown in FIG. 9).

FIG. 9 illustrates an SLA 900. SLA 900 comprises d single links 800, which are indicated as 800-0 through 800-(d−1), indirect memory 910, and accumulator memory 920. Each single link 800 corresponds to one dimension. In this example, there is no load/accumulate mux, although one could easily be added. The variables in FIG. 9 have been described in reference to FIG. 6. Basically, SLA 900 operates as shown in FIGS. 10 through 13. For simplicity, in FIGS. 10 through 13, $N_g$ is set to eight and d is set to eight.

Figure 10:
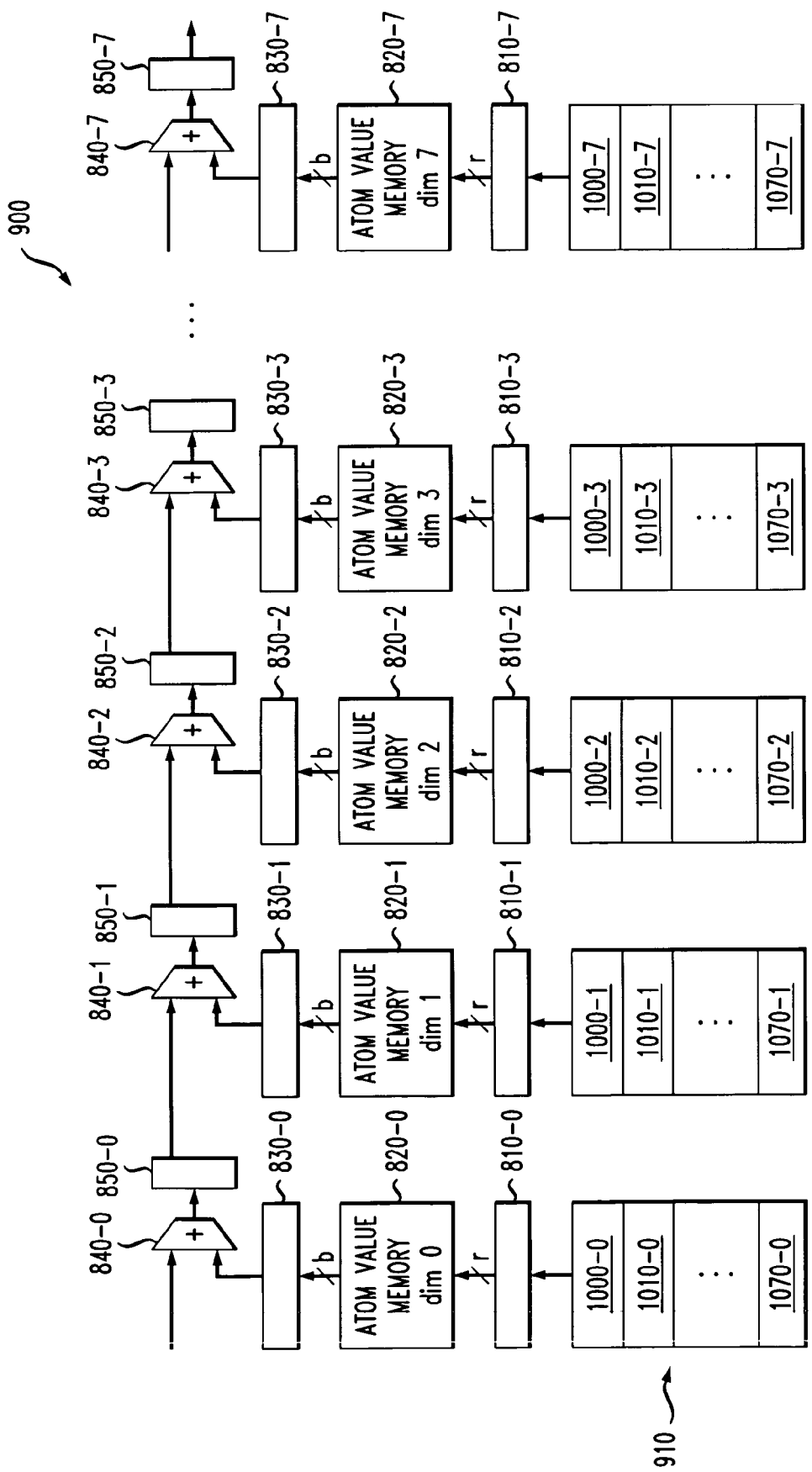
FIGS. 10 through 13 illustrate data flow through the SLA of FIG. 9, in accordance with one embodiment of the present invention.

FIG. 10 shows an initial state of SLA 900. Indirect memory 910 comprises eight banks of memory, each containing eight (i.e., $N_g$) atom indexes 1000 through 1070. Each atom index in a bank (i.e., a column) corresponds to one of eight Gaussians. Each row of indirect memory 910 therefore corresponds to a single Gaussian having eight (i.e., d) dimensions and eight atom indexes. Initially, the indirect memory 910 is loaded as shown in FIG. 10.

Figure 11:
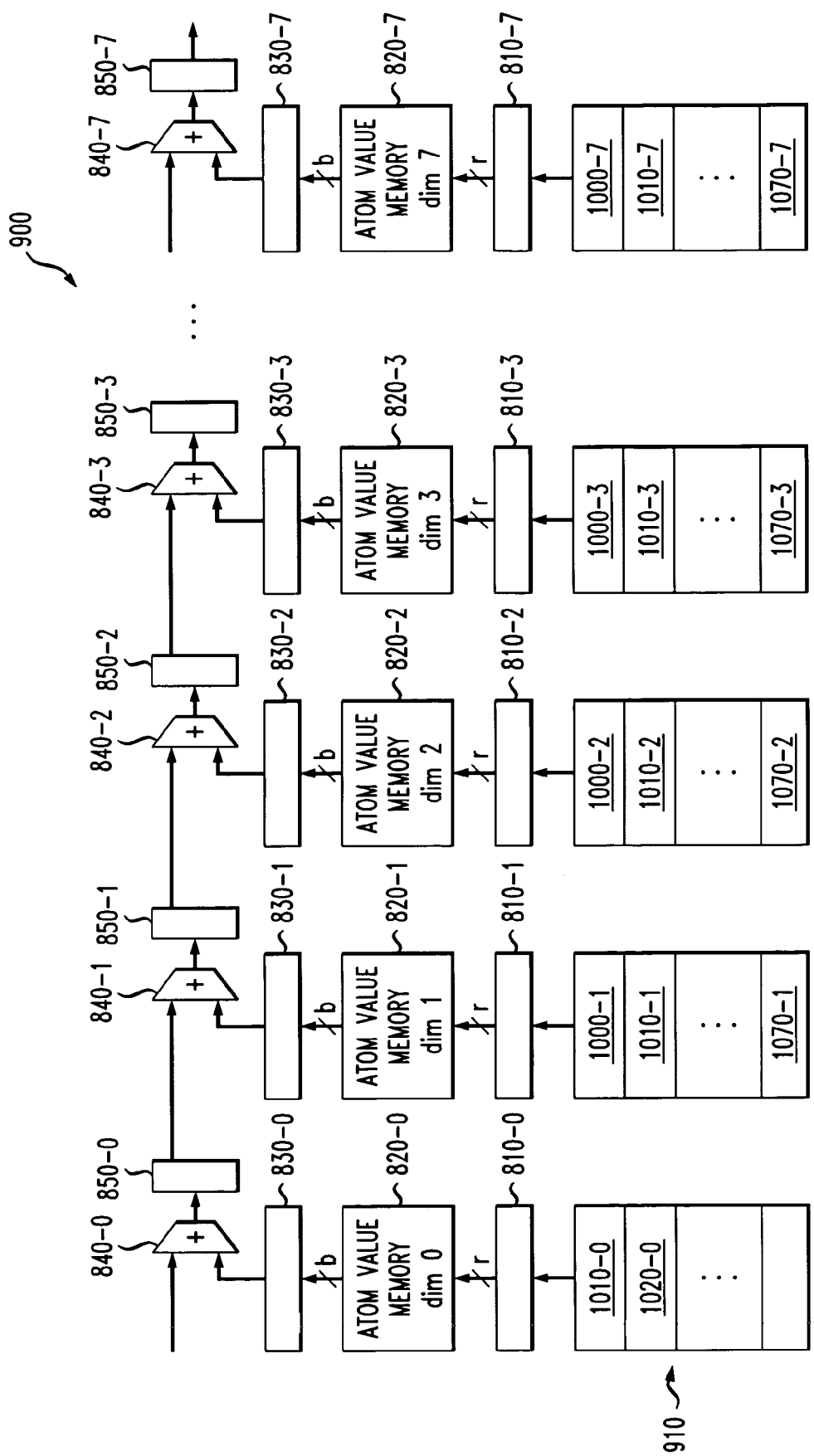

FIG. 11 shows SLA 910 after a single clock cycle. The atom index 1010-0 is now in index 810-0, which is driving the address lines for atom value memory 820-0 for dimension zero. Each atom index 1010-0 through 1070-0 has been moved up one location. Although not shown in the figure, another atom index would likely be moved into the position previously occupied by atom index 1070-0.

Figure 12:
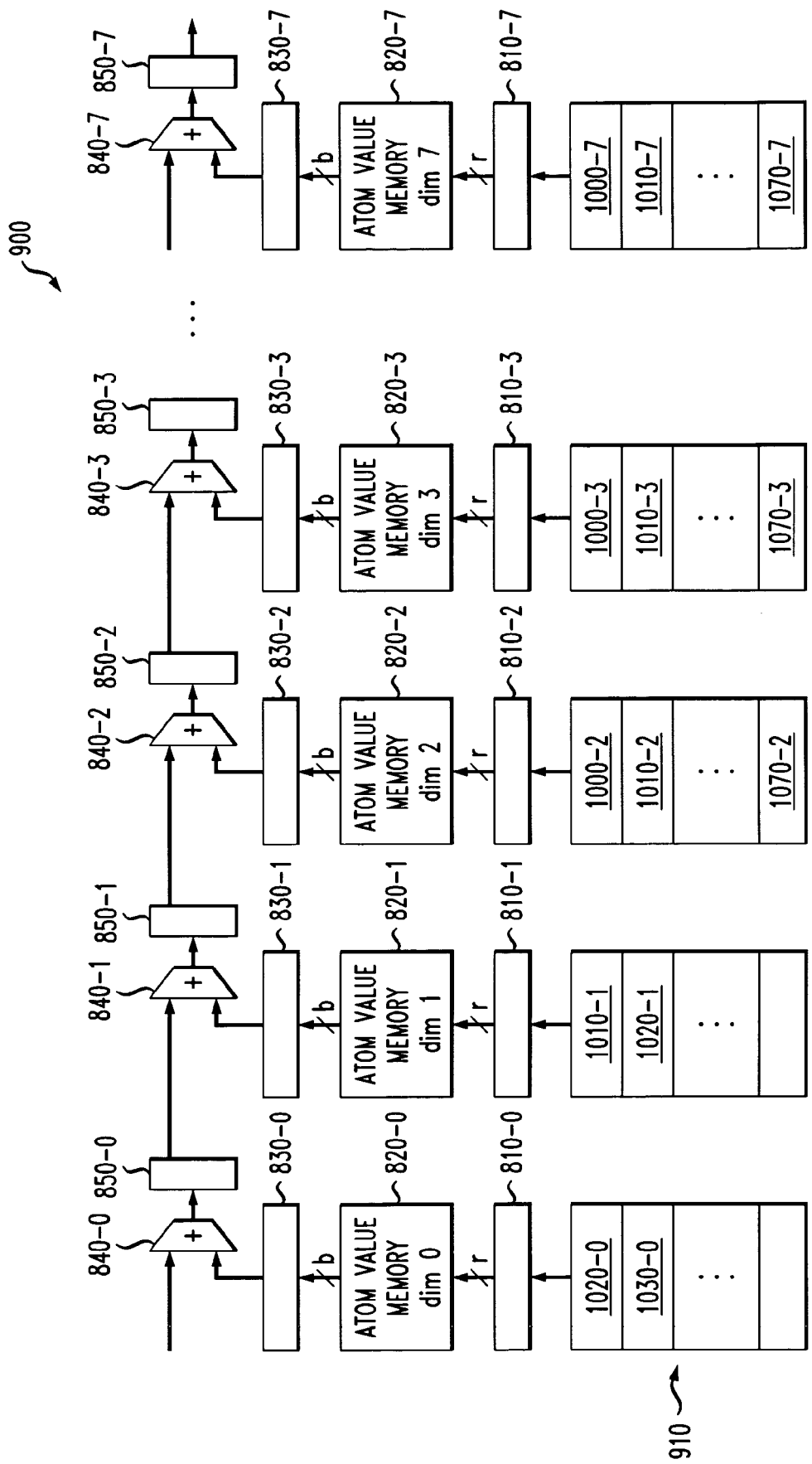

FIG. 12 shows SLA 910 after two clock cycles. The atom value 830-0 now corresponds to the atom value determined by atom index 1010-0. Atom index 1010-1 is now in index 810-0, which is driving the address lines for atom value memory 820-0 to select an appropriate atom value from this memory. Additionally, atom index 1000-1 is now in index 810-1 and is driving the address lines for atom value memory 820-1. This combination of address lines selects an appropriate atom value from atom value memory 820-1.

Figure 13:
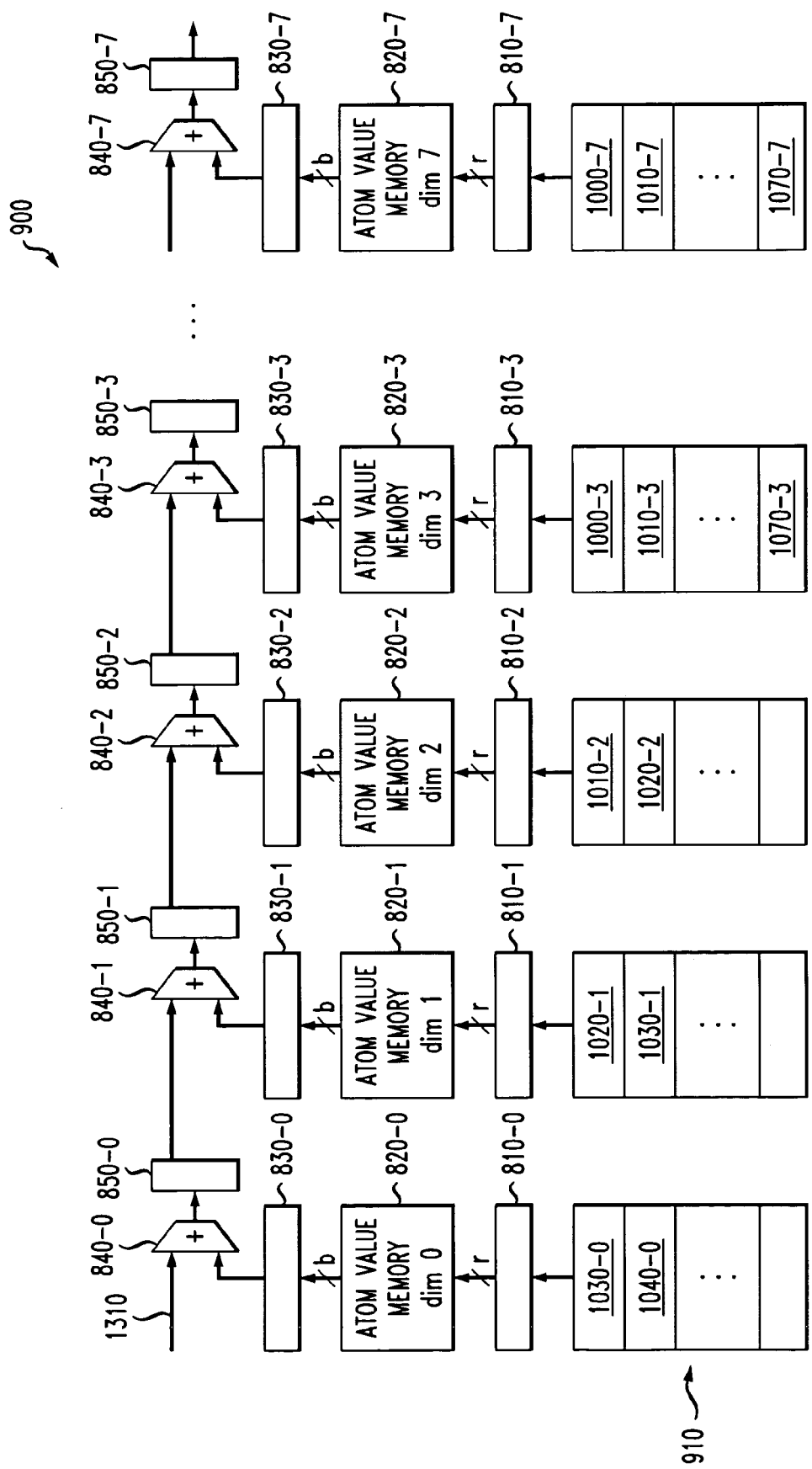

FIG. 13 shows SLA 920 after three clock cycles. Atom index 1030-0 has been moved into the position shown. Atom index 1020-0 is in index 810-0, which is driving the address lines for atom value memory 820-0 to select an appropriate atom value from this memory. Atom value 830-0 corresponds to the atom value determined by atom index 1020-0. The atom value determined by atom index 1010-0 has been added to whatever value was on line 1310, and the result resides in register 850-0. Atom index 1020-1 has been moved into the position shown. Atom index 1010-1 is in index 810-1, which is driving the address lines for atom value memory 820-1 to select an appropriate atom value from this memory. Atom value 830-1 corresponds to the atom value determined by atom index 1000-1. Finally, atom index 1010-2 has been moved into the position shown. Atom index 1000-2 is in index 810-2, which is driving the address lines for atom value memory 820-2 to select an appropriate atom value from this memory.

This process continues for 10 clock cycles, after which register 850-7 will contain a value corresponding to the logarithm of the first Gaussian (i.e., Gaussian zero) in indirect memory 910. It should be noted that a single adder circuitry, such as the adder circuitry 530 of FIG. 5, can be considered to be adders 840 and registers 850 of FIGS. 10 through 13.

Figure 14:
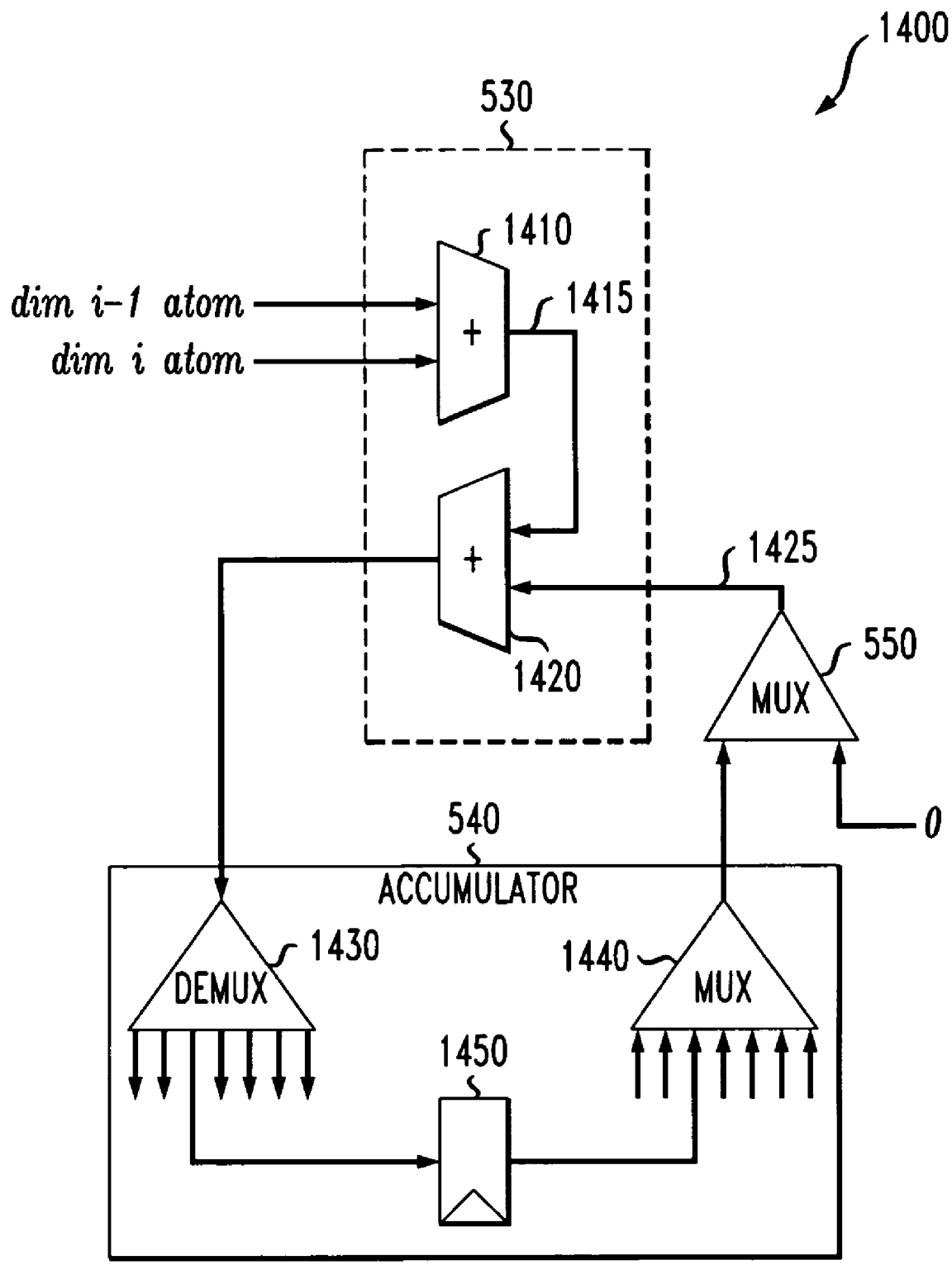
FIG. 14 is a block diagram of a portion of an SLA, in accordance with one embodiment of the present invention.

The previous two designs, while possible and appealing under various considerations of cost, latency and throughput, utilize too much chip area for an add-on to a low-cost microprocessor core. The design depicted in FIG. 14 is more suitable for a low-cost microprocessor core. FIG. 14 illustrations a portion 1400 of an SLA. Portion 1400 comprises, as in FIG. 5, adder circuitry 530, an accumulator 540, and a load/accumulate mux 550. Adder circuitry 530 comprises two adders 140 and 1420. Accumulator 540 comprises a de-multiplexer (demux) 1430, a mux 1440, and a number of registers, of which register 1450 is shown. Portion 1400 basically operates as follows.

Two atom values for two dimensions (for instance, dimensions zero and one) are added by adder 1410 to create result 1415. The load/accumulate mux 550 is configured to input zero. Adder 1420 then adds the result 1415 to the output 1425 of mux 550. The demux 1430 is configured to select one of the registers. The register currently selected is register 1450. The mux 1440 is also configured to select this register. Thus, in the current example, register 1450 contains the sum 0+1 (i.e., the atom value for dimension zero, added to the atom value for dimension one). Then, two more atom values for the next two dimensions (for instance dimensions 2 and 3) are added by adder 140, so that result 1415 contains the sum 2+3. Mux 550 is configured to select the output of mux 1440. Consequently, adder 1420 then produces the sum (0+1)+(2+3), which is then stored in register 1450. This process continues for all dimensions, whereupon another register is selected by demux 1430 and mux 1440.

Hence, only two operands emerge from the atom value memory in any given cycle of operation. These two operands are summed, and the result is accumulated into the appropriate element of the accumulator. This approach has the advantage that it devotes minimal silicon to the arithmetic data path, and yet is efficient enough to achieve the desired hardware performance goals.

Note, however, that if greater efficiency is desired, one of the alternative designs described above may be employed to exploit the large degree of latent parallelism available in the mathematical Equation (13) of the present technique.

Figure 15:
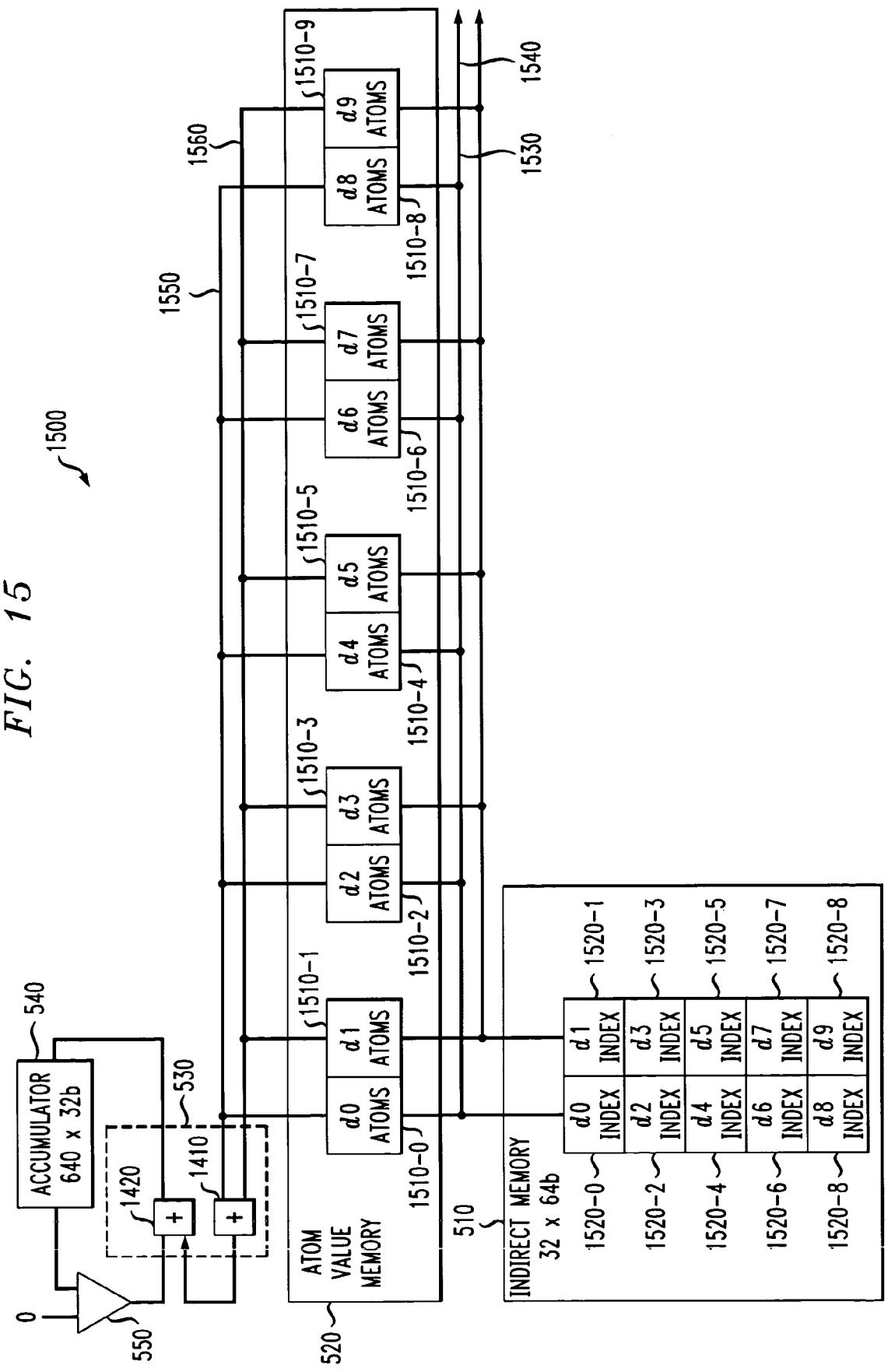
FIG. 15 is illustrates how the portion of the SLA shown in FIG. 14 can be integrated into a system, in accordance with one embodiment of the present invention.

In FIG. 15, an exemplary SLA 1500 is shown, which incorporates the portion 1400 of FIG. 14 and which is used for 10-dimensional operations. The values in FIG. 4 are used for all values other than d. SLA 1500 comprises indirect memory 510, atom value memory 520, adder circuitry 530, accumulator 540, and mux 550. As in FIG. 14, adder circuitry 530 comprises two adders 1410 and 1420. Atom value memory 520 is separated into ten sections 1510, each section 1510 having 64 atom values for a particular dimension, each atom being stored in 32 bits. The indirect memory 510 similarly is separated into 10 indexes 1520, each of which indexes 32 Gaussians for one dimension, which makes each index 1520 32×64 bits in size. Accumulator 540 has a size of 640×32 bits.

There are several ways for this SLA 1500 to operate. In one exemplary way, the indirect memory 510 puts the addresses indicated by indexes 1520-0 and 1520-1 on buses 1530 and 1540, respectively, while enabling sections 1510-0 and 1510-1. This allows each bus 1530, 1540 to use 6 bits. The atom values in these sections 1510-0 and 1510-1 will be placed on buses 1550 and 1560, respectively. Each bus 1550, 1560 is 32 bits. These values are added by adder 1410, as described previously. The indirect memory 510 continues to place addresses defined by indexes 1520-2 and 1520-3, then 1520-4 and 1520-5, and so forth, until the computation is complete. Another way for this to operate is without the use of enable signals, but this requires more address bits and consequently more space to store atom indexes.

It is noted as well that there is freedom in the sizes of the various memories. For practical reasons, it is beneficial to choose the value d=10 for a design of an SLA, particularly because many typical speech recognition systems have 40 or more dimensions. Let D be the true number of model dimensions. The mismatch between the assumed number of dimensions d and the true number of dimensions D can be got round using the methods described immediately below, in Section 5.1. However, these methods force the SLA to consume more bandwidth to main memory, than if d were chosen equal to D.

5. Extensions and Refinements

In this section, various extensions and refinements of the basic scheme described above are considered. Techniques are discussed for handling high dimensional models, handling more atoms per dimension, performing hierarchical labeling, and handling functions that are not completely separable, in the sense defined in Section 2.2.

5.1 Handling More Dimensions

To handle more than d dimensions, it suffices to observe that the decomposition of Equation (13) can be extended as $$\log g(v) \approx (a_{0_{i_0}}(v_0) + a_{1_{i_1}}(v_1) + \cdots + a_{d-1_{i_{d-1}}}(v_{d-1})) + \\ (a_{d_{i_d}}(v_d) + a_{d+1_{i_{d+1}}}(v_{d+1}) + \cdots + a_{2d-1_{i_{2d-1}}}(v_{2d-1})) + \cdots \quad (15)$$

Recall that the SLA, in one invocation, effectively computes one complete row of summations, as expressed in Equation (15) just above. Thus a calculation may proceed by accumulating over blocks of d dimensions at a time, providing that the accumulator is not cleared after each invocation of the SLA. Note that, in general, from one block to the next, both the atom value memory and the indirect memory must be reloaded. One possible exception to this occurs when performing hierarchical labeling, as described below.

Figure 16:
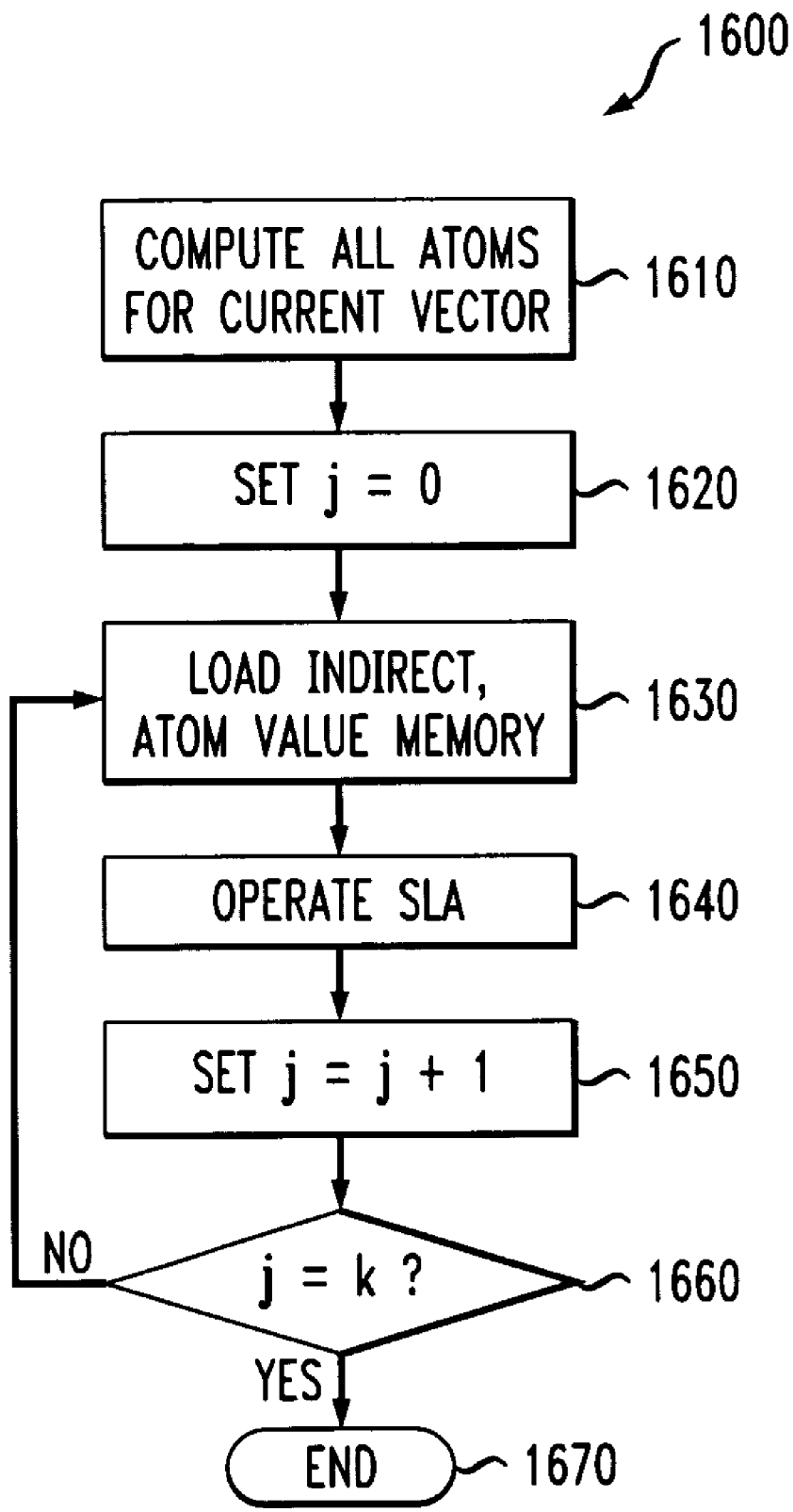
FIG. 16 is a flowchart of a method to operate on more dimensions than an SLA was originally designed to handle, in accordance with one embodiment of the present invention.

For clarity, the following is an algorithm for processing a model comprising a number D=kd dimensions, where k is an integer greater than one. Note that if D is not an integral multiple of k, it can effectively be made into one by extending the model with unused dimensions, and entering all zeros into the elements of atom value memory that correspond to the dummy dimensions. Accumulating sums over the dummy atoms has no effect upon the final result. The algorithm is shown as method 1600 of FIG. 16. Method 1600 is used to process more dimensions than an implementation of an SLA was originally designed to process.

In step 1610, the values of all atoms for the current observation vector, v, are computed. In step 1620, the value j is set to zero (i.e., j←0). In step 1630, the indirect memory and atom value memory are loaded with their values for dimensions jd,jd+1, . . . , (j+1)d−1.

In step 1640, the SLA is operated using the current (just-loaded) entries of the indirect memory and atom value memory. If j=0, and for the first two dimensions processed, set the load/accumulate mux to load. If j>0, and for every other dimension pair, set the load/accumulate mux to accumulate.

In step 1650, set j←j+1. If j=k, i.e., step 1660=YES, the computation is complete, and the desired values may be extracted from the accumulator. Otherwise (step 1660=NO), j<k. Continue at step 1630 above with the next block of d dimensions.

Note that the computation of atom values associated with dimensions jd,jd+1, . . . , (j+1)d−1, for j>0, may be overlapped with the operation of the SLA, when the SLA is processing dimensions j'd,j'd+1, . . . , (j'+1)d−1 with j'<j. This additional opportunity for parallelism may be easily exploited.

5.2 Handling More Atoms per Dimension

In this section, the issue of handling a larger number of atoms per dimension is addressed. This mode of operation is called the "many atom mode."

As explained above, the atom value memory is configured for some fixed number A atoms per dimension. Typically, for optimal use of the k bits of atom index that can be stored in each entry of the indirect memory, A is an integral power of 2, that is $A=2^k$ for the integer k. It is now shown how this architecture may be exploited for efficient computation of any number $A'=m \cdot (A-1)$ atoms per dimension, where m>1.

Let the A' distinct atoms be divided into m stanzas of A−1 atoms each. To each stanza, in each dimension, one null atom value is joined. This is an atom with numerical value 0, so that accumulating it into the full sum for a particular Gaussian has no effect on the outcome.

Now many atom mode is explained. Recall that in normal operation (that is to say, only A atoms per dimension), after running through the d dimensions of atom indices and atom values for a given set of Gaussians, the accumulator contains the collection of log Gaussian values. These are then transferred back to main memory, and the accumulator is cleared before restarting the computation for a new set of Gaussians, or a new observation vector. However, when operating in many atom mode, rather than effecting the transfer of the accumulator contents back to main memory, and thereafter clearing the accumulator, the accelerator simply continues processing through one stanza after another, never clearing the accumulator. This permits any of the A−1 atoms in any of the m distinct stanzas to be the one selected for accumulation for a particular Gaussian.

The only difficulty with this mode of operation is that the design of the accelerator is such that whenever processing a given stanza, some atom value should be selected for accumulation into each log Gaussian represented in the accumulator. This then is the purpose of the null atom value: to permit the depositing of an index (corresponding to the null atom) into the indirect memory for a given stanza, such that if the atom desired for a given Gaussian and dimension does not appear in that stanza, an accumulation may nevertheless be specified for the stanza that has no effect upon the accumulator entry associated to the given Gaussian.

To make this more clear, suppose the stanzas are numbered 0, 1, . . . , m−1, and consider a particular Gaussian g, and a particular dimension r. Suppose that the null atom has index 0 in each stanza, and that for the given Gaussian g and dimension r, the associated atom is index i (with $1 \leq i \leq A-1$) in stanza s (with $0 \leq s \leq m-1$). Then for any stanza except stanza s, atom index 0 is recorded for Gaussian g, dimension r. In stanza s however, the index i is recorded for the given Gaussian and dimension.

Figure 17:
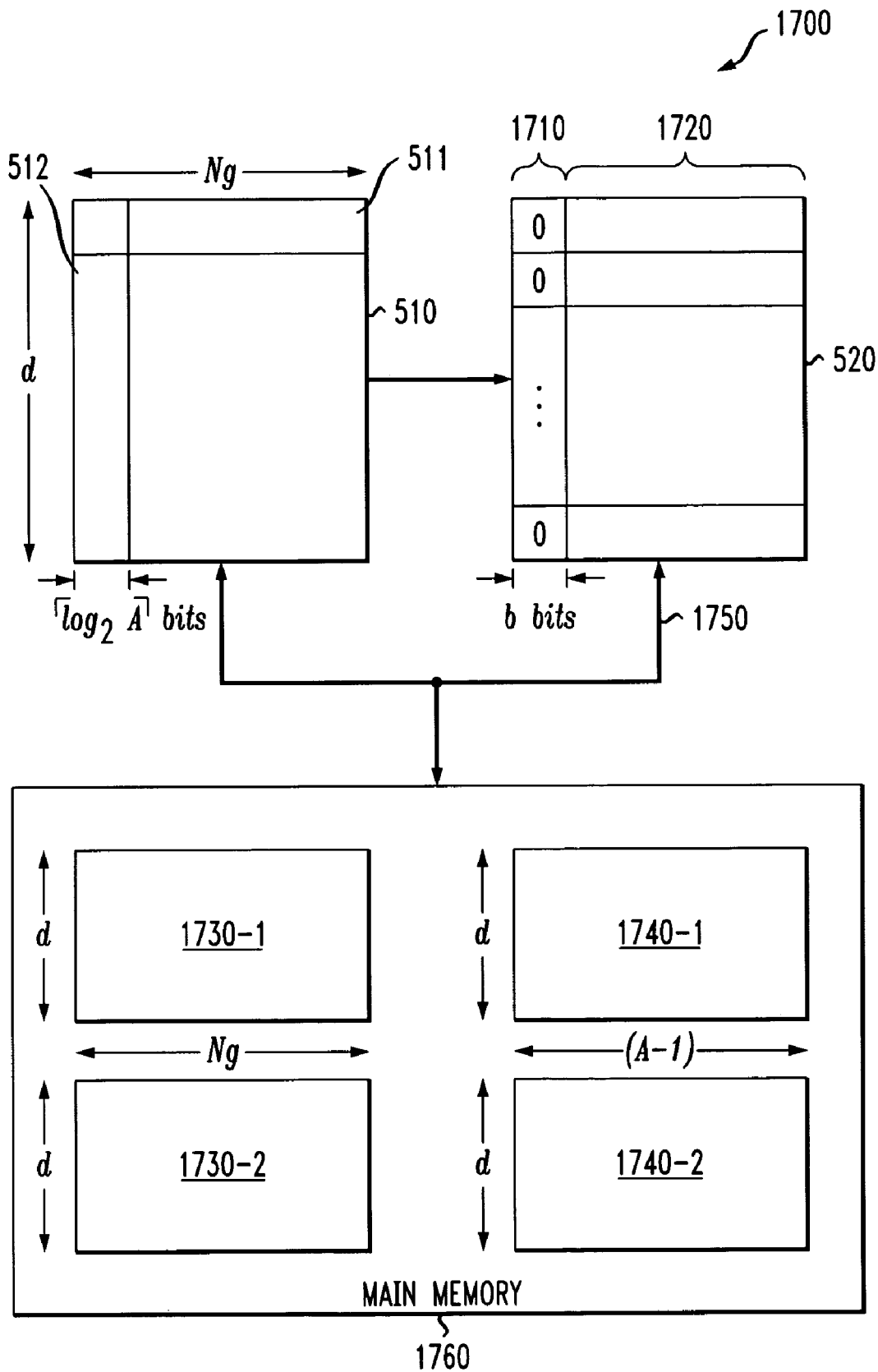
FIG. 17 illustrates an exemplary system for handling more dimensions than an SLA was originally designed for, in accordance with one embodiment of the present invention.

An example of a system using the many atom mode is shown in FIG. 1700. FIG. 17 illustrates an exemplary system 1700 for handling more dimensions than an SLA was originally designed for. System 1700 comprises indirect memory 510, atom value memory 520, and main memory 1760. Main memory 1760 is connected to indirect memory 510 and atom value memory 520 through bus 1750. As before, indirect memory 510 is a number of Gaussians wide ($N_g$) and d dimensions deep. Also as before, atom value memory 520 is A atoms wide and d dimensions deep. Main memory comprises atom value memory copies 1730-1, 1730-2 and atom value memory copies 1740-1, 1740-2. Atom value memory copies 1730-1, 1730-2 are $N_g$ units wide and d dimensions deep. Atom value memory copies 1740-1, 1740-2 are (A−1)b bits wide and d dimensions deep.

In this example, column 1710 is filled with zeros. This means that any index in indirect memory 510 having an address that selects an element from column 1710 will add a zero to the current calculation. There are (A−1) columns 1720. First, the accumulator (not shown) is zeroed. Initially, indirect memory 510 is loaded with indirect memory copy 1730-1 and the (A−1) columns 1720 of atom value memory 520 are loaded with the atom value memory copy 1740-1. The appropriate calculations are performed. Then, indirect memory 510 is loaded with indirect memory copy 1730-2 and the (A−1) columns 1720 of atom value memory 520 are loaded with the atom value memory copy 1740-2. Another set of calculations are performed. During the two sets of calculations, the accumulator accumulates. After the two sets of calculations, the results are removed from the accumulator.

It should be noted that FIG. 17 represents only one technique for performing the many atom mode. Those skilled in the art will be able to identify other techniques for performing the many atom mode. For example, the indirect memory copy 1730-1 could comprise an additional bit for each of the $N_g$ units. This bit could be used to determine whether the atom for a particular Gaussian resides in atom value memory copy 1760-1 or 1760-2. A controller (not shown), such as control unit 560 of FIG. 5, could examine this bit and either load the address into memory 510 to select an atom from column 1710 or load the address to select an atom from one of the columns 1720. Additionally, it should be noted that adding columns of zeros to atom value memory copies 1740 allows any number of atoms to be used in these calculations. Moreover, atom value memory copies 1740-1 and 1740-2 could be A units wide and designed with their first columns (or any other column) defined as column 1710 is defined.

5.3 Hierarchical Labeling

As mentioned above, it is desirable to avoid computing even the approximate value of every Gaussian in the model M. For this reason, the set of all Gaussians is organized into a tree, with each Gaussian in the model appearing at the bottom level of the tree. Note that this tree is not the decision tree mentioned briefly above, which occasions the nomenclature "leaf" for the mixture-of-Gaussian models ultimately computed. Organizing Gaussians into a tree is commonly called "hierarchical labeling." The latter is described in more detail in U.S. Pat. No. 6,023,673, entitled "Hierarchical Labeler in a Speech Recognition System," issued date Feb. 8, 2000, the disclosure of which is incorporated herein by reference.

At the top of the tree, some number $L_1$ of Gaussians are found, at the next level $L_2$ Gaussians with $L_1 < L_2$, and so on for each succeeding level, with $L_i$ Gaussians at the ith level, and $L_i < L_{i+1}$. To each Gaussian $g(\cdot)$ at level i are assimilated some children $h_1(\cdot), h_2(\cdot), \ldots h_{n_g}(\cdot)$ at level i+1, where $n_g$ is the number of children of Gaussian g.

Recall that ultimately, only the K highest-ranking Gaussians are desired from the complete set of Gaussians that comprise the model M. The objective of the hierarchical organization is to provide a structure for exploring only those sections of the tree that are likely to yield a high-ranking Gaussian at the bottom level. While the techniques for constructing the tree are not described here, it is designed with the following property: if a Gaussian g at level i−1 has high likelihood, then it is probable that one of the K highest-ranking Gaussians, at the bottom level, lies in the subtree that depends from g.

Figure 18:
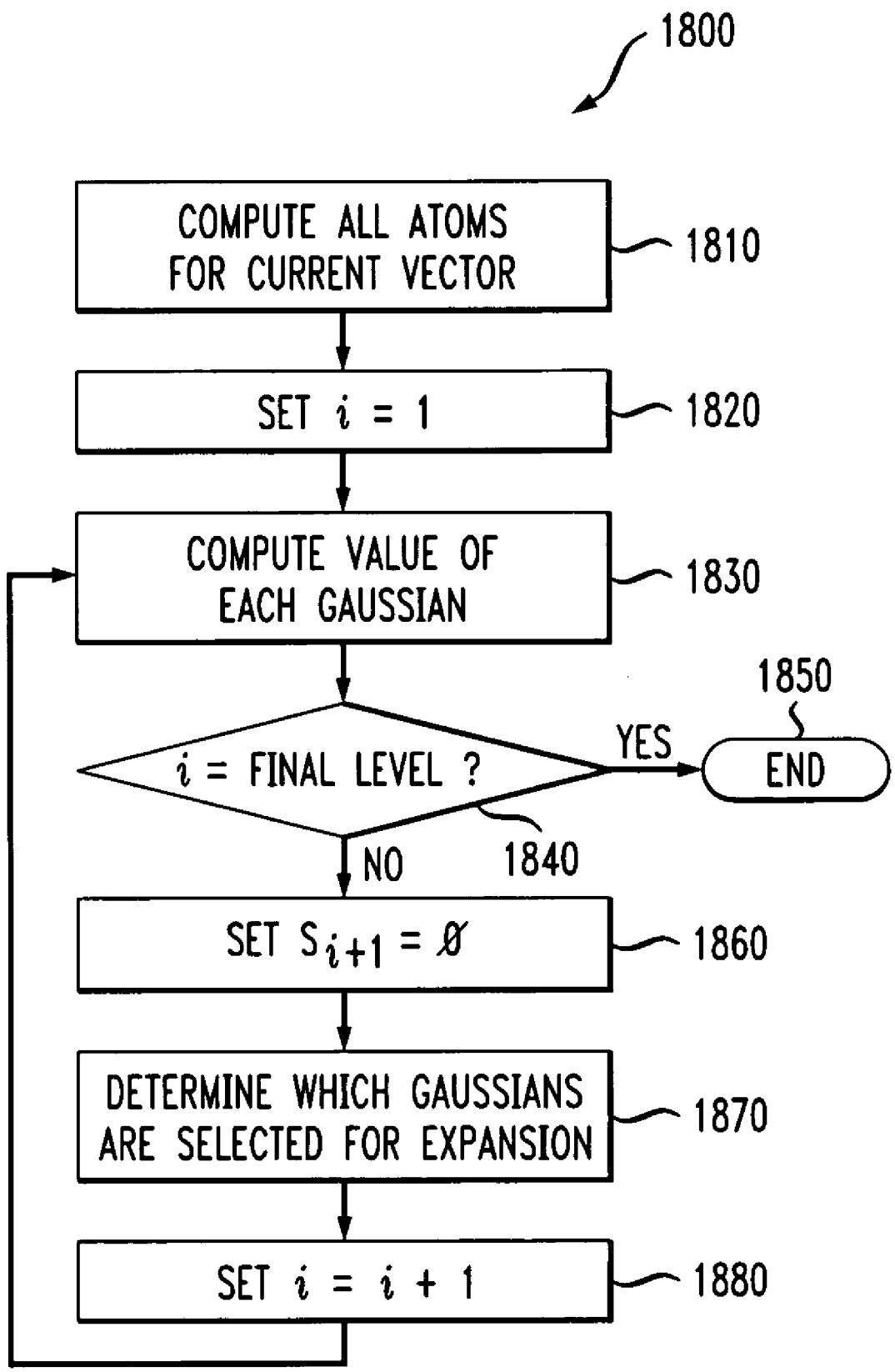
FIG. 18 is a flowchart of a method for performing hierarchical labeling when operating with an SLA, in accordance with one embodiment of the present invention.

Thus, when operating an SLA that uses hierarchical labeling, the method 1800 shown in FIG. 18 is used. Method 1800 is as follows.

In step 1810, the values of all atoms for the current observation vector, v, are computed. Note that the same set of atoms is generally used for all levels of the tree.

Begin at level i=1 (step 1820). Place all Gaussians at this level into the set $s_i$, which is the set of all searchable Gaussians at level i. In step 1830, using the SLA hardware, the current atom values, and appropriate values for the indirect memory, compute the (approximate) value of each Gaussian $g \in s_i$. Note that this computation proceeds only over the set $S_i$ at level i.

If i is the final level of the tree (step 1840=YES), select the K highest ranking Gaussians from those just computed, and use these to determine the K highest ranking leaves. The computation is now complete (step 1850).

Otherwise, i is not the final level of the tree. Set $S_{i+1} \leftarrow \emptyset$ (step 1860). In step 1870, determine which Gaussians $g \in s_i$ are selected for expansion. For instance, a g may be selected for expansion if it is sufficiently high-ranking in likelihood among those in $S_i$, or if its likelihood is within some predetermined factor of g*(v), where this is defined to be the highest-ranking element of $S_i$. For all g selected for expansion, by whatever criterion, let $S_{i+1} \leftarrow S_{i+1} \cup \{h_1, \ldots, h_{n_g}\}$, where $h_1, \ldots, h_{n_g}$ are the children of g.

Set i←i+1 (step 1880). Go to step 1830 above.

In a typical tree built to implement this algorithm, the tree has three levels, with $L_1=128$, $L_2=2048$, and $L_3=10000$. Thus the fan-out from level 1 to level 2 is about 16, which is to say on average each level 1 Gaussian has 16 children. Likewise, the fan-out from level 2 to level 3 is about 5. As noted above, the algorithm begins by selecting all level 1 Gaussians for expansion. Thereafter, typically about 3×128=384 Gaussians are evaluated at level 2, and about 5×128=640 Gaussians are evaluated at level 3. It is this latter number that drove the recommended design decision $T_g=640$, as in FIG. 6 above. Note, however, that, while these values are typical, including the number of levels, they are not requirements.

Earlier, the opportunity was mentioned that, under special circumstances, the system could avoid reloading the atom value memory after processing each block of d dimensions. These special circumstances are now explained.

In the process of performing hierarchical labeling, consider the move from level $L_i$ to level $L_{i+1}$, and recall that the atoms used in any particular block of dimensions are the same for every level of the hierarchy. Suppose (as is typical) that the model in question has some number of dimensions D, with D=kd for some k>1. As described in Section 5.1, some provisions must be made for processing blocks of d dimensions in succession.

Observe though that the order in which blocks are processed is completely arbitrary, as addition is nominally commutative. Suppose then that at level i, the system has just finished processing the very last block of dimensions, that is from dimension (k−d)d through kd−1, inclusive. The atoms appropriate to this block of dimensions therefore reside in the atom value memory. Thus, a system can avoid loading this set of atom values again, if the computation is initiated at level i+1 with this same block of dimensions.

Indeed, the system may then work downward through blocks of dimensions in level i+1, ending with dimensions numbered 0 through d−1. Then, in advancing to level ii+2, the system may initiate that computation at the low end of dimensions, thereby saving a reload of the atom values associated with those dimensions. This zig-zag through blocks of dimensions may be used throughout the traversal of succeeding levels of the tree, and is in fact implemented directly in hardware.

Figure 19:
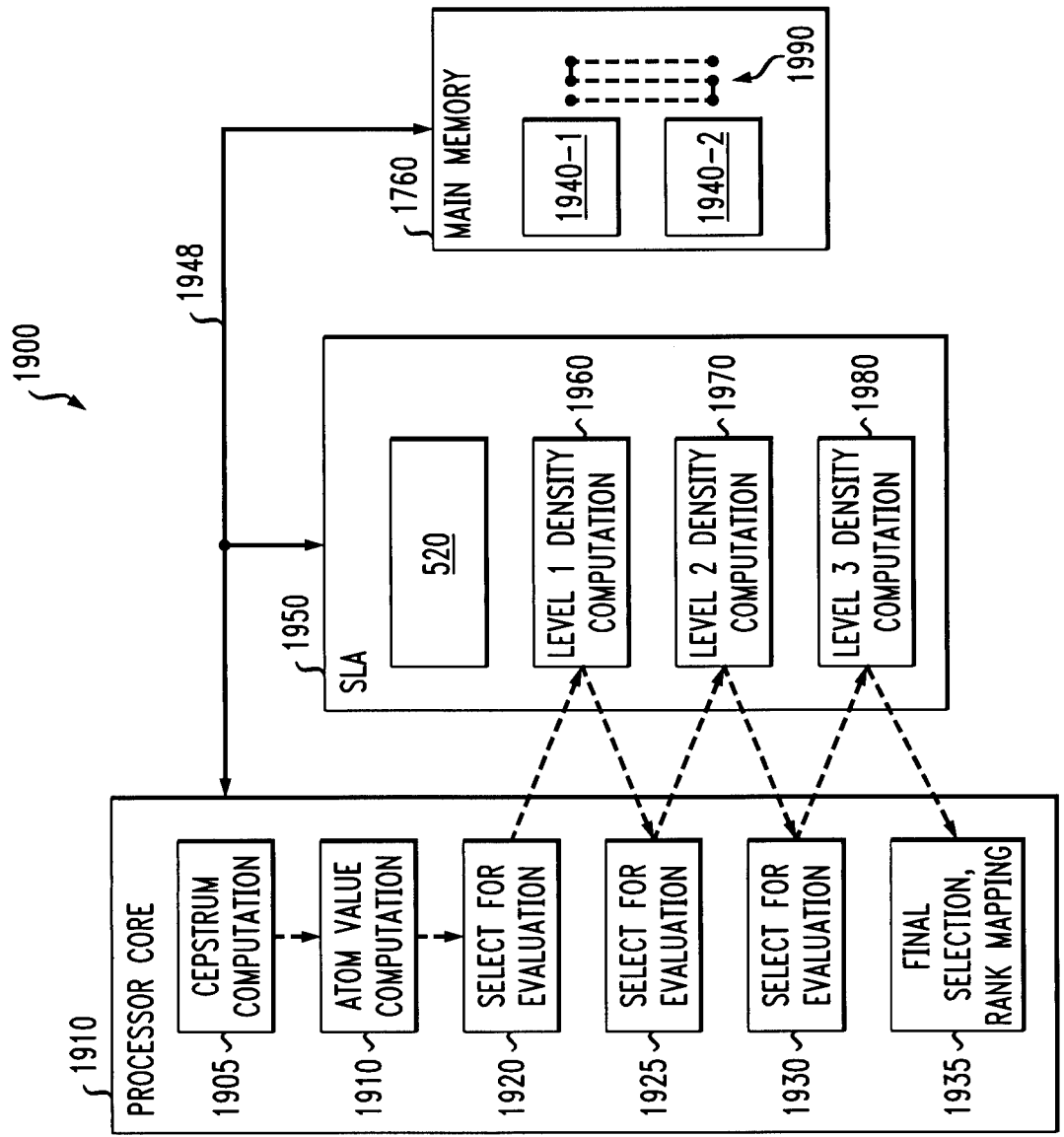
FIG. 19 illustrates a block diagram of a system for performing a "zig-zag" method that speeds processing of blocks of dimensions, in accordance with embodiments of the present invention.

This is more easily explained with reference to a figure. Turning now to FIG. 19, a system 1900 is shown comprising a processor core 1910, an SLA 1950, and a main memory 1760, all interconnected through bus 1948. FIG. 19 is used mainly to illustrate a sequence of steps that are performed, and which device performs which step. Processor core 1910 comprises steps 1905 through 1935. SLA 1950 comprises three steps 1960 through 1980. As before, main memory 1760 comprises atom value memory copies 1940-1 and 1940-2. The sequence of steps that will now be described is merely exemplary, and the sequence should not be construed to be limiting.

Assume that there are 20 dimensions, and the SLA 1950 is designed for 10 dimensions; also assume that there are 64 atoms per dimension and that the SLA 1950 is designed for 64 atoms per dimension. Cepstrum computation 1905 is performed first. Next, atom value computation 1910 is performed. Step 1910 creates two sets of atom values, each set having 10 dimensions. Atom value memory copy 1940-1 contains atom values for the first 10 dimensions (i.e., dimensions 0 through 9), while atom value memory copy 1940-2 contains atom values for the next 10 dimensions (i.e., dimensions 10 through 19). In step 1920, additional Gaussians, from the first level, are selected for evaluation. The SLA performs step 1960, which performs a level one density computation, as previously described. The processor core 1910 then selects some of the Gaussians for the next level (step 1925), and SLA 1950 performs a level two density computation in step 1970. Again, more Gaussians are selected (step 1930 by processor core 1910), this time from the last level, and SLA 1950 performs a level 3 density computation in step 1980. The processor core 1910 performs step 1935, where it performs a final selection and rank mapping. In FIG. 19, lines 1985 indicated the flow of operations, while lines 1990 indicate the "zig-zag" that occurs with atom value memory copies 1940-1 and 1940-2.

The zig-zag method works as follows. When SLA 1950 performs step 1960, main memory 1760 loads the atom value memory copy 1940-1 into the atom value memory 520 and performs calculations for the first set of dimensions. Then, SLA 1950 loads the atom value memory copy 1940-2 into the atom value memory 520 and performs calculations for the second set of dimensions. When SLA 1950 performs step 1970, the atom value memory copy 1940-2 is already loaded into the atom value memory 520. Consequently, the level two density computation 1970 proceeds backwards, in that atom value memory copy 1940-2 is used first for calculations for the second set of dimensions. Then, atom value memory copy 1940-1 is loaded into atom value memory 520 and used for calculations for the first set of dimensions. When level three density computation 1980 is performed, it again proceeds forwards, in that atom value memory copy 1940-1 is used first for calculations for the first set of dimensions. Then, atom value memory copy 1940-1 is loaded into atom value memory 520 and used for calculations for the second set of dimensions. Lines 1990 indicate the "zig-zag" that occurs.

5.4 Partial Separability

In this section, the example of the Gaussian is returned to, and it is shown how the invention may be applied even when the function $f(v)$ is not completely separable. For the purposes of exposition, consider the case when the Gaussian $g(v)$ has a covariance matrix $\Sigma$ that is 2×2 block diagonal, thus $$\sum = \begin{bmatrix} \sigma_{11}^2 & \sigma_{12} & & & \\ \sigma_{21} & \sigma_{22}^2 & & & \\ & & \sigma_{33}^2 & \sigma_{34} & \\ & & \sigma_{43} & \sigma_{44}^2 & \\ & & & & \ddots \end{bmatrix} \quad (16)$$

The following can be written: $\Sigma_{12}$ for the submatrix in rows 1, 2 and columns 1, 2; $\Sigma_{34}$ for the submatrix in rows 3, 4 and columns 3, 4; and so on. Then, by a straightforward computation, $$\log g(v) = -\frac{1}{2}(v_{12} - \mu_{12})^T \sum_{12}^{-1} (v_{12} - \mu_{12}) - \log\left(2\pi |\sum_{12}|^{1/2}\right) - \\ \frac{1}{2}(v_{34} - \mu_{34})^T \sum_{34}^{-1} (v_{34} - \mu_{34}) - \log\left(2\pi |\sum_{34}|^{1/2}\right) - \\ \frac{1}{2}(v_{d-1_d} - \mu_{d-1_d})^T \sum_{d-1_d}^{-1} (v_{d-1_d} - \mu_{d-1_d}) - \log\left(2\pi |\sum_{d-1_d}|^{1/2}\right) \quad (17)$$

where $v_{i-1_i}$ is a two-element column vector consisting of elements i-1 and i of v, and likewise for $\mu_{i-1_i}$. Thus a partial decomposition of log g(v) into ⌈d/2⌉ functions is $$f_{i-1_i}(v_{i-1}, v_i) = -\frac{1}{2}(v_{i-1_i} - \mu_{i-1_i})^T \sum_{i-1_i}^{-1} (v_{i-1_i} - \mu_{i-1_i}) - \log\left(2\pi |\sum_{i-1_i}|^{1/2}\right) \quad (18)$$

Providing then that it is possible to find a suitable collection of atoms for the family of functions $\{f_{j,i-1_i}(v_{i-1}, v_i)\}_{j=1}^M$, then one may apply exactly the same hardware to approximating log g(v), even when this log kernel is only partially separable. This method is of course generalizable to an arbitrary pdf that is partially separable. Gaussians were chosen here purely for expository reasons.

In fact, a scheme similar to the one presented above, which uses splitting functions of two observation vector elements, has actually been implemented within some speech recognition systems. This method is referred to as "dual band quantization." It should be noted though that the implementation uses purely diagonal matrices, that is, each 2×2 block is itself diagonal. The dual band approach is used just to save memory and processing time.

It is worth noting that the elements of v may be permuted at will to bring them to an order that permits the desired characteristic of partial separability to be exhibited. Likewise, there is nothing special about 2×2 block-diagonal covariance matrices. Indeed, the technique illustrated here may be applied for instance with varying numbers of arguments to the different splitting functions. For instance, in a 6-dimensional space, one might write $$f(v) = f_1(v_1) + f_2(v_2, v_3) + f_3(v_4, v_5, v_6) \quad (19)$$

if the structure of the original collection of kernels $\{g_j(v)\}_{j=1}^M$ so dictate.

5.5 Other Kernel Expressions

Note that a given splitting function may have a complicated structure. For instance, it may itself be a mixture of Gaussians. That is, one might in principle have $$f_i(v_i) = w_1 g_1(v_i) + w_2 g_2(v_i) + \ldots w_N g_N(v_i), \quad (20)$$

where each $gk(v_i)$ is a univariate Gaussian. Such a technique, known as the compound Gaussian method, is the subject of a U.S. patent application Ser. No. 09/566,092, entitled "High-Dimensional Acoustic Modeling via Mixtures of Compound Gaussians and Linear Transformations," by Chen et al., filed May 5, 2000, the disclosure of which is incorporated herein by reference. Indeed, the more complicated each splitting function is, the more appropriate it is to use the representation and computation scheme described above. One difficulty in applying this technique is finding a suitable collection of atoms.

5.6 Application to Non-Gaussian Probability Density Functions

Although the discussion until now has focused on Gaussian pdfs, the present invention is equally suitable for non-Gaussian pdfs. The present discussion has focused on Gaussian pdfs because these pdfs are commonly used in speech recognition and for simplicity of exposition. However, there are systems that use other pdfs. One such system is described in Ney, "Experiments on Mixture-Density Phoneme-Modeling for the Speaker-independent 1000-word Speech Recognition DARPA Task," IEEE Conf. on Acoustics, Speech, and Signal Processing, vol. 2, 713–716 (1990), the disclosure of which is incorporated herein by reference. This reference discusses the use of Laplacian densities but does no comparison between Laplacians and Gaussians. A second system, which describes what are called "alpha-stable densities," is Basu et al., "Maximum Likelihood Estimates for Exponential type density Families," IEEE Conf. on Acoustics, Speech, and Signal Processing, vol. 1, 361–364 (1999), the disclosure of which is incorporated herein by reference. Thus, the present invention is application to non-Gaussian functions as well as Gaussian functions.

6. Practical Issues

In this section, a number of practical issues regarding the use of the SLA are addressed. In Section 6.1, the integration of the SLA with software and hardware is described. In Section 6.2, the load the SLA imposes on the bus to main memory is estimated, and it is shown that its impact is small. In Section 6.3, the area of the core is estimated, in one exemplary implementation. From this, an estimate of power consumption may be derived. In Section 6.4, the impact of the SLA on recognition accuracy is discussed. In Section 6.5, more information regarding interfaces to the SLA are described.

6.1 Integration with Embedded Speech

Figure 20:
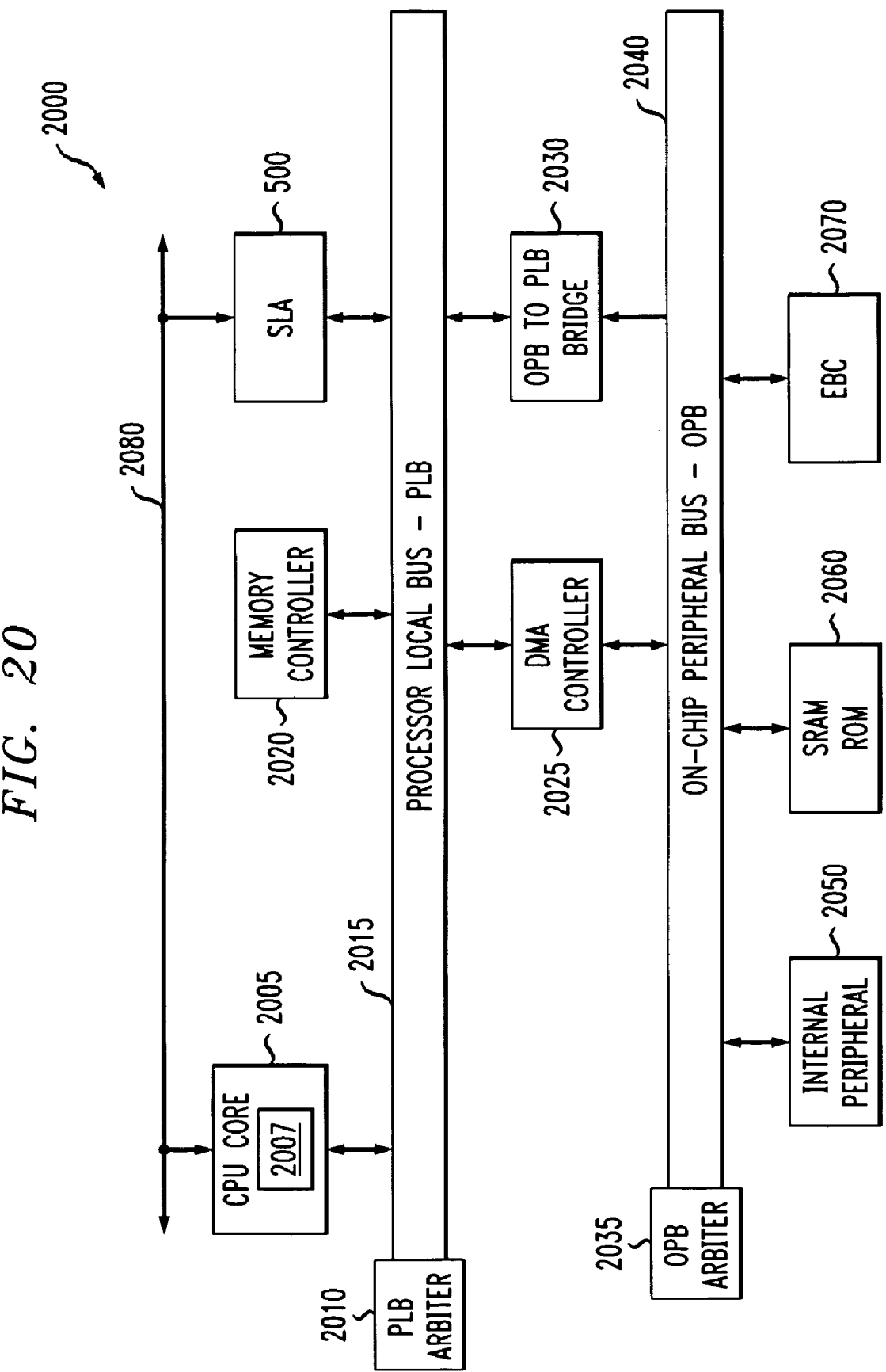
FIG. 20 illustrates a block diagram of a system on a chip that incorporates an SLA, in accordance with one embodiment of the present invention.

Referring now to FIG. 20, a System On a Chip (SOC) 2000 is shown. SOC 2000 comprises a Central Processing Unit (CPU) core 2005, a Processor Local Bus (PLB) arbiter 2010, a PLB 2015, a memory controller 2020, an SLA 500, a Direct Memory Access (DMA) controller 2025, an On-Chip peripheral Bus (OPB) to PLB bridge 2030, an OPB arbiter 2035, an OPB 2040, an internal peripheral 2050, main memory 2060, an Extended Bus Controller (EBC) 2070, and a Device Control Register (DCR) bus 2080. Main memory 2060, in this example, comprises Static Random Access Memory (SRAM) and Read-Only Memory (ROM). However, Dynamic RAM (DRAM) may also be used.

CPU core 2005 comprises cache 2007. Optionally, cache 2007 may be separate from CPU core 2005. PLB arbiter 2010 determines which device of the CPU core 2005, memory controller 2020 and SLA 500 is allowed to control the PCB 2015. Similarly, OPB arbiter 2035 determines which device of the DMA controller 2025, bridge 2030, main memory 2060, peripheral 2050 or EBC 2070 controls OPB 2040. Memory controller 2020 controls access to memories, such as main memory 2060. It should be noted that main memory 2060 may also be placed off-chip. Internal peripheral is one of any number of devices, such as an analog-to-digital converter. EBC 2070 controls access to off-chip devices, such as memory or peripherals. DCB 2080 is used to configure on-chip devices, such as SLA 500.

System 200 shows a system 2000 where SLA 500 is built on the same silicon substrate as CPU core 2005. However, the PLB 2015 could be off-chip from the CPU core 2005, thereby allowing the SLA to be off-chip. Operation of system 2000 is discussed in more detail below, although it is relatively self-explanatory for one skilled in the art.

While the SLA implements a large share of processing associated with the labeling step, there are still some functions performed in software by CPU core 2005. Software would generally be loaded into main memory 2060. Notably, the functions recommended to be performed by software are (1) accumulating the log prior information into the weighted Gaussian computation, as expressed in Equation (14) above, and (2) sorting of Gaussians by likelihood, and selecting Gaussians for expansion at each level of the hierarchy. These steps will continue to be performed by the CPU core 2005.

In one embodiment, the SLA 500 is intended to be integrated with a speech recognition engine (i.e., loaded in main memory 2060) by means of a library, which encompasses an SLA driver. The library and SLA driver will reside in main memory 2060. By making a suitable collection of calls to subroutines in the library, a programmer may set up various control registers of the SLA 500. For instance, such calls will establish the absolute memory location of atom values, Gaussian index tables, and so on. The programmer will then start the SLA 500 by issuing what appears to be a procedure call, which returns immediately. The programmer will then have the choice of polling main memory 2060 for a flag that indicates that the SLA 500 has completed, or installing an interrupt handler to process a hardware-done interrupt set by the SLA 500. The SLA 500 replaces key elements of functions, particularly the labeling functions, of the speech recognition engine.

In this embodiment, one key point in programming the SLA 500 is that it interacts with the CPU core 2005 exclusively through main memory 2060, even though the CPU core 2005 and the SLA 500 reside on the same physical die. In particular, this means that values computed by the processor core should be flushed from cache 2007 to main memory 2060, before any main memory 2060 locations are queried by the SLA 500. Conversely, values transferred from the SLA 500 to main memory 2060 via DMA must in fact be read by the CPU core 2005 from main memory 2060, and not from the its cache 2007. Thus, the operating system (not shown) should, for this embodiment, have provisions for marking certain regions of main memory 2060 non-cacheable.

6.2 Bus Bandwidth

Here, the question of bus bandwidth to main memory and logical connectivity with the rest of the design is discussed. This question will be approached as follows. First, determine the number of bytes transferred in one full frame of labeling, as performed by the SLA 500. Next, assume a particular frame rate, and determine the traffic imposed on the bus in bytes per second. Finally, assume a particular bus speed, and determine the fraction of available bus width consumed by the SLA 500.

This discussion begins by considering the bus traffic associated with one full frame of labeling. This traffic falls into the following three categories: atom value loading, indirect memory loading, and result retrieval. Next, traffic for each category is estimated.

6.2.1 Atom Value Loading

Define the table of parameters shown in FIG. 21. Observe that k loads of the atom value memory are required at level one of the hierarchy, followed by k−1 loads at each succeeding level. Each load transfers b bits/atom by A atoms/dimension by d dimensions=A·d·b bits. Thus, the total number of bytes transferred in loading atoms, written $B_{atom}$, is $$B_{atom} = (k+(k-1)(H-1)) \cdot A \cdot d \cdot b / 8 \qquad (21)$$

For the typical values given above, $B_{atom}$=25600 bytes.

6.2.2 Indirect Memory Loading

The key parameters in this computation are shown in FIG. 22. The number of bits of index to represent a block of d dimensions is therefore r·d. Hence, the number of bytes to represent this same block of indices is $\lceil r \cdot d/8 \rceil$. Thus, the total number of bytes transferred in loading the indirect memory is $$B_{index} = k \cdot \left\lceil \frac{r \cdot d}{8} \right\rceil \cdot G. \quad (22)$$

6.2.3 Result Retrieval

The key parameters in this calculation are shown in FIG. 23. The total number of bytes required to retrieve results from the accumulator to main memory is therefore $b \cdot G/8$. However, recall that the SLA only computes Gaussian values. The main CPU is required to intercede between levels of the hierarchical computation, and determine which Gaussians will be selected for expansion. Thus, each Gaussian must be propagated twice across the main memory/processor die boundary, if the main memory is off-chip: once when written by the SLA, and again when read by the cpu. Thus the total number of bytes transferred in retrieving results is $$B_{results} = \frac{2bG}{8}. \quad (23)$$

For the typical values given above, $B_{result}$=9216 bytes.

6.2.4 Summary and Analysis

It has now been established that in one frame of SLA processing, the total number of bytes transferred over the main system bus is $$B_{frame} = B_{atom} + B_{index} + B_{result} \quad (24)$$

$$= (k + (k-1)(H-1)) \cdot A \cdot d \cdot b/8 + k \cdot \left\lceil \frac{r \cdot d}{8} \right\rceil \cdot G + \frac{2bg}{8}$$

For the values given above, this yields $B_{frame}$=25600+ 36864+9216=71680 bytes/frame. Now let $t_{frame}$ be the frame "rate," by which is meant the time in seconds between the initiation of successive frames of processing. Then the total number of bytes transferred per second, in a continuously operating recognition system, is $$B_{total} = B_{frame}/t_{frame}. \quad (25)$$

A typical value for $t_{frame}$ is 15 milliseconds (ms), or 0.015 seconds (s), which yields a typical value of $B_{total}$=71680/ 0.015=4,778,667 bytes/s.

Now the average number of cycles for a 128-byte transfer on a 64-bit wide processor local bus (PLB), using a 32-bit Synchronous DRAM, is 45 cycles. Assume a 50 MHz PLB, which results in a cycle time of $\tau=1/(5\times10^7)=2\times10^{-8}$s. Thus, the aggregate total bus bandwidth is T=128/45τ=142 million bytes/s. Therefore in typical operation, the SLA consumes about (4.78/142)×100≈3.4% of available bus bandwidth, which is a small amount.

6.3 Area and Power Consumption

The area of one possible core is approximately 220,000 cells in International Business Machine 7SF technology (SA-27E), or about 0.9 square millimeters. From this figure, an estimate of power consumption may be deduced, by treating the power usage of the core as a fraction, according to area, of the power consumption of the processor. While this power has not been estimated, it is likely to be relatively small.

6.4 Accuracy Improvements

So far, the discussion in this section has centered on latency and power consumption issues. Because the SLA implements the time-consuming portion of the labeling algorithm in hardware, it is possible to contemplate constructing recognition systems with much more computationally demanding acoustic models, providing they can be mapped to the SLA architecture.

One such example is the method of discriminative features, proposed by Ellen Eide of IBM Watson Research Center. In preliminary tests, the use of discriminative features reduced the sentence error rate (SER) by 25 percent to 40 percent, relative to a system without such features. This is a very substantial performance improvement.

A problem with the discriminative feature approach is that it approximately quintuples the amount of time that must be spent in the labeler, and this is prohibitive for a normal speech recognition system that performs speech recognition through software. However, the required computation maps naturally onto the SLA. Thus it would be relatively easy to implement such a system, with little or no impact on latency, on a processor that was equipped with the SLA core. For this reason, it is believed the SLA may enable the construction of speech recognition systems that are at once faster, more power efficient, and substantially more accurate.

6.5 Another Exemplary SLA

Figure 24:
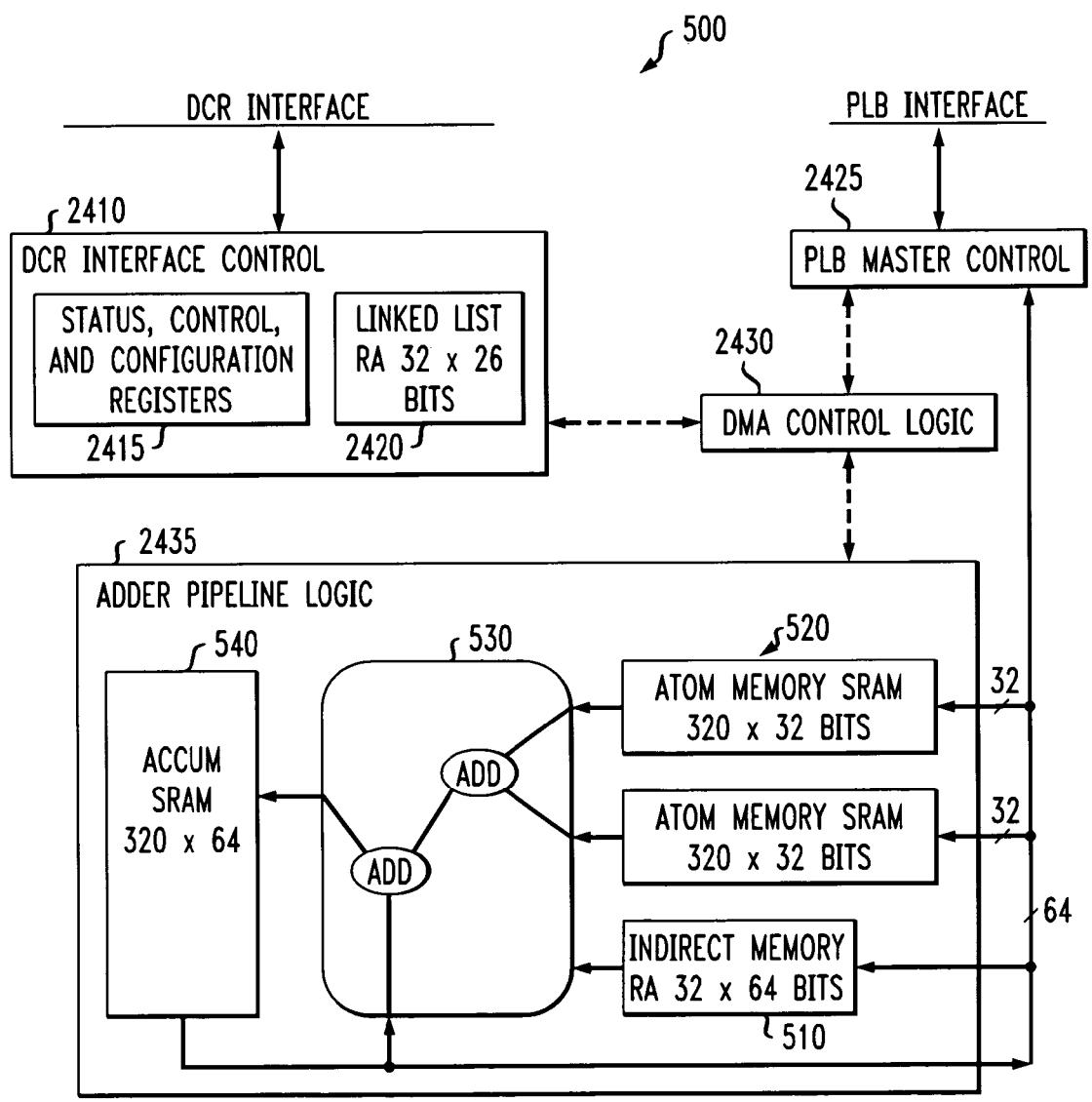
FIG. 24 is a block diagram of the SLA of FIG. 20, in accordance with one embodiment of the present invention.

The SLA of FIG. 20 is shown more particularly in FIG. 24. Turning now to FIG. 24, SLA 5000 comprises a DCR interface control 2410, a number of registers 2415, a PLB master control 2425, a DMA control logic 2430, an adder pipeline logic block 2345, which itself comprises indirect memory 510, atom value memory 520, adder circuitry 530, and an accumulator 540. The present discussion acts as a fairly succinct synopsis of the present invention (although this synopsis should not be construed to be limiting) and acts to describe a potential embodiment for an SLA.

In one embodiment, the SLA 500 will be used to speed up the processing required in a speech label algorithm for acoustic modeling in speech recognition. At the observation frequency (e.g., every 10 ms), the main CPU or possibly another core computes the atom values for an observation vector. The observation vector contains multiple dimensions of Atoms and consists of 64, 32-bit signed values for each dimension.

The labeler algorithm determines the best match for identification of a sound by applying high-dimensional Gaussian probability density functions to the observation vector. The application of the Gaussian probability density functions is simplified to blocks of summations of selected atom values, defined by a predefined index into each Atom dimension. The typical application implements 40 dimensions however for this core, the number of dimensions may be any multiple of 10 up to 320 dimensions. A larger number of dimensions allows for more precise labeling and identification. For the SLA 500, any form of indices may be used, not necessarily Gaussian functions. The final summation values written back to system memory by the SLA core are used by software to determine the best match or to define the next set of indices to be applied to further refine the search for the best match.

The SLA is initialized by system software to indicate the starting location of the Atom values and the starting location and size of the of the General Indirect memory that contains the indices. The CPU (not shown in FIG. 24) also writes the SLA configuration registers 2415 and linked list 2410 to indicate which blocks of indices are to be applied to the atom values to compute the sums. The CPU then writes to the SLA control register, which exists in registers 2415, to indicate that processing is required and to indicate the number of passes of 10 dimensions to perform.

Figure 25:
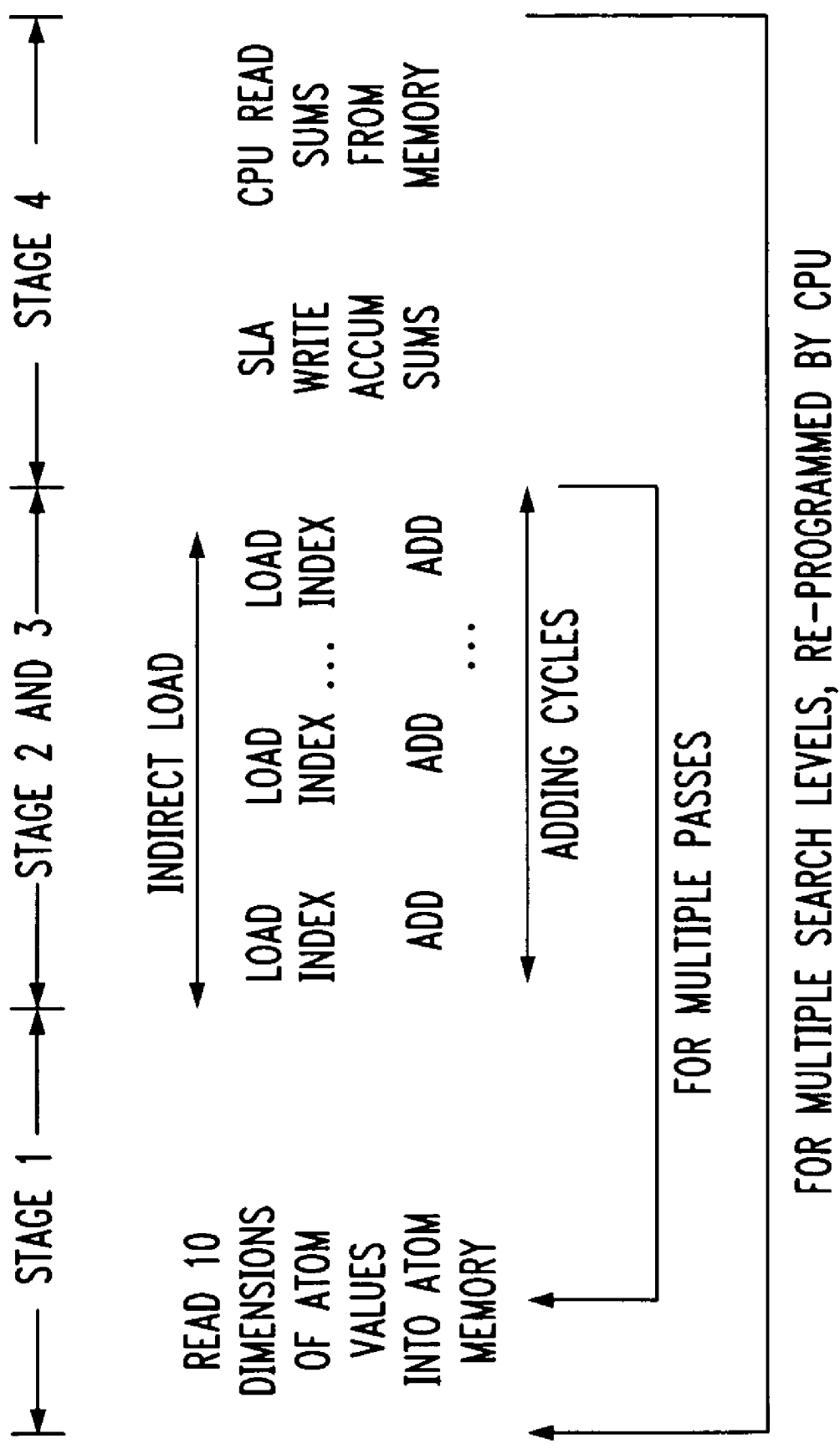
FIG. 25 is a diagram of a method for using the SLA of FIG. 24, in accordance with one embodiment of the present invention.

As shown in FIG. 25 (with appropriate reference to FIG. 24), SLA processing generally comprises four stages. The first stage comprises loading the first 10 dimensions of the atom values into the core atom memory 520. In the second stage, 10 dimension, 16 entry blocks at a time of indices defined in the linked list 2420 are loaded into each half of the core indirect memory 510. The third stage operation is the pipelined computation of each atom sum with the result stored into the accumulator 540. The indices in the indirect memory 510 are used to select an atom value in each of the 10 dimensions to be added together to create the accumulator 240 sum. The second and third stage are repeated and overlapped until all sums described in the linked list 2420 for the first 10 dimensions have been computed and stored into the accumulator 540. If more passes are required, that is, more dimensions are required to computed the summation, the SLA will return to the first stage. Atom memory for the next 10 dimensions is loaded into the atom memory 520.

The SLA 500 starts at the top of the linked list 2420 again to load the indices for the next 10 dimensions. Stages two and three are repeated, adding the accumulator sum from the previous pass. In the forth stage, the SLA writes the accumulator 240 results to a particular starting memory address, then indicates to the CPU that the operation has completed. The CPU may then read the accumulator results from memory.

In a typical application, the summation computations will be done multiple times for up to three search levels, using the same atom values and different blocks of general indices at the observation frequency.

It is to be understood that the embodiments and variations shown and described herein are merely illustrative of the principles of this invention and that various modifications may be implemented by those skilled in the art without departing from the scope and spirit of the invention. For instance, although this invention is discussed in terms of its application to speech recognition, the basic problem of rapid evaluation of a large number of pdfs, expressed as mixtures of separable kernels, occurs frequently in other areas of computing. The application of the invention to those areas is also claimed.

What is claimed is:

1. A system comprising:
a processor;
a memory coupled to the processor; and
a speech label accelerator (SLA) coupled to the processor and the memory, the SLA comprising:
an indirect memory adapted to store a fixed plurality of indexes corresponding to a fixed plurality of atom functions;
an atom value memory coupled to the indirect memory, the atom value memory adapted to store a fixed plurality of atom values corresponding to a fixed plurality of atom functions, wherein each of the indexes selects one of the atom values in the atom value memory, wherein each of the atom values is determined for a particular input vector and a particular atom function, and wherein the atom functions are selected to represent a plurality of kernel functions thereby providing an approximation to the plurality of kernel functions; and
adder circuitry coupled to the atom value memory, the adder circuitry adapted to add atom values selected by indexes of the indirect memory.

2. A speech label accelerator (SLA) comprising:
an indirect memory adapted to store a fixed plurality of indexes corresponding to a fixed plurality of atom functions;
an atom value memory coupled to the indirect memory, the atom value memory adapted to store a fixed plurality of atom values corresponding to a fixed plurality of atom functions, wherein each of the indexes selects one of the atom values in the atom value memory, wherein each of the atom values is determined for a particular input vector and a particular atom function, and wherein the atom functions are selected to represent a plurality of kernel functions thereby providing an approximation to the plurality of kernel functions; and
adder circuitry coupled to the atom value memory, the adder circuitry adapted to add atom values selected by indexes of the indirect memory.

3. The SLA of claim 2, wherein each of the atom functions has domain $R^d$ for some plurality of dimensions, d.

4. The SLA of claim 2, wherein each of the atom functions has domain R for a single dimension.

5. The SLA of claim 2, wherein the atom and kernel functions are logarithms of other functions.

6. The SLA of claim 2, wherein the kernel functions are completely separable.

7. The SLA of claim 2, wherein the kernel functions are partially separable.

8. The SLA of claim 2, wherein the atom and kernel functions are Gaussian functions.

9. The SLA of claim 2, wherein the atom and kernel functions are non-Gaussian functions.

10. The SLA of claim 2, wherein the atom functions are mixtures of Gaussians and the kernel functions are compound Gaussian functions.

11. The SLA of claim 2, further comprising a load/accumulate multiplexer (mux) and an accumulator having an input and output, the load/accumulate mux having two inputs and an output, wherein the adder circuitry comprises a first and second adder, each having two inputs and an output, the inputs of the first adder coupled to the atom value memory, a first input of the second adder coupled to the output of the first adder, a second input of the second adder coupled to the output of the load/accumulate mux, an input of the load/accumulate mux coupled to the output of the accumulator, and the output of the second adder coupled to the input of the accumulator.

12. The SLA of claim 11, wherein the accumulator comprises a demultiplexer (demux), a mux, and a plurality of registers, the demux having an input and a plurality of outputs, the mux having a plurality of inputs and an output, the input of the demux coupled to the input of the accumulator, each of the registers coupled to one output of the demux and to one input of the mux, and the output of the mux coupled to the output of the accumulator.

13. The SLA of claim 2, further comprising an accumulator coupled to the adder circuitry, the accumulator adapted to accumulate at least one result of additions between atom values.

14. The SLA of claim 13, further comprising a load/accumulate multiplexer (mux) having a first input coupled to the accumulator, an output coupled to an input of the adder circuitry, and a second input coupled to a zero value.

15. The SLA of claim 14, further comprising a control unit coupled to the indirect memory, atom value memory, adder circuitry, and accumulator.

16. The SLA of claim 2, wherein the adder circuitry comprises a pipelined adder chain.

17. The SLA of claim 16, wherein the pipelined adder chain comprises a number of single dimension adders, wherein the number of single dimension adders is the same as the number of dimensions.

18. The SLA of claim 17, wherein each single dimension adder comprises an adder adding a previous dimension adder output to a selected atom value, wherein the selected atom values are input to each of the single dimension adders in parallel.

19. The SLA of claim 2, wherein the adder circuitry comprises a pipelined tree of adders.

20. The SLA of claim 19, wherein the pipelined tree of adders comprises a plurality of stages, each of the stages comprising a plurality of adders and at least one register.

21. The SLA of claim 20, wherein a number of dimensions is denoted by d, wherein n is a stage number, wherein each stage comprises $\lfloor d/(2^n) \rfloor$ sums in parallel, and wherein there are $\lceil \log_2 d \rceil$ stages.

22. The SLA of claim 21, further comprising an accumulator coupled to the adder circuitry, wherein the adder circuitry further comprises a final stage when d is an integral power of two.

23. A method comprising the steps of:
determining, for a particular input vector, a plurality of atom values, wherein each of the atom values is determined from an atom function that represents a plurality of kernel functions thereby providing an approximation to the plurality of kernel functions, and wherein said atom function is used to label speech;
loading a portion of the plurality of atom values into an atom value memory adapted to store a fixed number of atom values;
loading a portion of a plurality of indexes into an indirect memory adapted to store a fixed number of indexes, each of the loaded indexes adapted to select one of the atom values in the atom value memory, each of the loaded indexes corresponding to one of a fixed number of kernel functions;
selecting at least one index from the indirect memory;
retrieving at least one atom value corresponding to the at least one selected index from the atom value memory, one atom value retrieved per selected index; and
accumulating the at least one retrieved atom value.

24. The method of claim 23, further comprising the step of determining the plurality of indexes.

25. The method of claim 23, wherein the atom value memory comprises a size comprising a fixed number of atom functions by a fixed number of dimensions and wherein the indirect memory comprises a size comprising a fixed number of kernel functions by a fixed number of dimensions.

26. The method of claim 23, wherein each of the atom functions has domain $R^d$ for some plurality of dimensions, d.

27. The method of claim 23, wherein each of the atom functions has domain R for a single dimension.

28. The method of claim 23, wherein each of the atom and kernel functions is a logarithm of another function.

29. The method of claim 23, wherein each of the kernel functions is completely separable.

30. The method of claim 23, wherein at least one of the kernel functions is partially separable.

31. The method of claim 23, wherein each of the atom and kernel functions is a Gaussian function.

32. The method of claim 23, wherein the atom and kernel functions are non-Gaussian functions.

33. The method of claim 23, wherein the atom functions are mixtures of Gaussians and the kernel functions are compound Gaussian functions.

34. The method of claim 23, wherein the step of accumulating the retrieved atom value further comprises the steps of:
adding the retrieved atom value to a value from an accumulator to create a result;
updating the accumulator with the result; and
setting the accumulator to zero prior to the step of selecting at least one index from the atom value memory.

35. The method of claim 23, further comprising the step of performing the steps of selecting, retrieving, and accumulating until all indexes corresponding to a selected one of the fixed number of kernel functions have been selected, wherein all atom values corresponding to the selected kernel function are accumulated.

36. The method of claim 35, wherein the step of performing the steps of selecting, retrieving, and accumulating until all indexes corresponding to a selected one of the fixed number of kernel functions have been selected further comprises the steps of performing the steps of selecting and retrieving in parallel for every two indexes for the selected kernel function, and performing the step of accumulating after the two atom values have been retrieved.

37. The method of claim 35, wherein the method further comprises the step of selecting another of the kernel functions, and wherein the step of performing the steps of selecting, retrieving, and accumulating further comprises the steps of:
performing the steps of selecting, retrieving, and accumulating until all indexes for the selected kernel function have been selected; and
performing the previous step and the step of selecting another of the kernel functions until all the kernel functions have been selected, wherein all atom values, corresponding to indexes from the fixed number of kernel functions, are accumulated.

38. The method of claim 35, wherein:
the step of determining, for a particular input vector, a plurality of atom values further comprises the steps of
determining, for a particular input vector, a plurality of atom values corresponding to a plurality of atom functions having a first number of dimensions, wherein the first number of dimensions is larger than a number of dimensions of the atom value memory; and
separating the atom values into blocks, each block comprising atom functions having the number of dimensions of the atom value memory;
the step of loading of portion of the plurality of atom values into an atom value memory comprises the step of loading a selected one of the blocks into atom value memory; and
the step of performing the steps of selecting, retrieving, and accumulating further comprises the steps of:
performing the steps of selecting, retrieving, and accumulating until all indexes corresponding to the selected kernel function and to the selected block have been selected;
loading another selected block of atom values into the atom value memory; and
performing the two previous steps until all blocks have been selected, wherein all atom values corresponding to indexes for the selected kernel function are accumulated.

39. The method of claim 35, wherein:
the step of determining, for a particular input vector, a plurality of atom values further comprises the steps of:
selecting one of a plurality of hierarchical levels;
determining, for a particular input vector, a plurality of atom values corresponding to a plurality of atom functions having a first number of dimensions, wherein the first number of dimensions is larger than a number of dimensions of the atom value memory;
separating the atom values into blocks, each block comprising atom functions having the fixed number of dimensions; and
assigning the blocks an order;
the step of loading a portion of the plurality of atom values into the atom value memory comprises the step of loading a selected one of the blocks into atom value memory; and
the step of performing the steps of selecting, retrieving, and accumulating further comprises the steps of:
performing the steps of selecting, retrieving, and accumulating until all indexes for the selected block of the selected kernel function have been selected;
selecting a next highest ordered block as the selected block and loading the selected block into the atom value memory;
performing the two previous steps until all blocks have been selected, wherein all atom values corresponding to indexes for the selected kernel function and for the selected level are accumulated, wherein the last block in the order resides in the atom memory;
selecting another of the hierarchical levels;
performing the steps of selecting, retrieving, and accumulating until all indexes for the selected block of the selected kernel function have been selected;
selecting a next lowest ordered block of atom values as the selected block loading the selected block into the atom value memory;
performing the three previous steps until all blocks have been selected, wherein all atom values corresponding to indexes for the selected kernel function and for the selected level are accumulated.

40. The method of claim 35, wherein:
the step of determining, for a particular input vector, a plurality of atom values further comprises the steps of
determining, for a particular input vector, a plurality of atom values corresponding to a plurality of atoms having a first number of dimensions, wherein the first number of dimensions is larger than a number of dimensions of the atom value memory; and
separating the atom values into blocks, each block comprising atom functions having the number of dimensions of the atom value memory;
the step of loading a portion of the plurality of atom values into the atom value memory comprises the step of loading a selected one of the blocks into atom value memory;
the step of performing the steps of selecting, retrieving, and accumulating further comprises the steps of:
performing the steps of selecting, retrieving, and accumulating until all indexes for one block of the selected kernel function have been selected;
loading another selected block of atom values into the atom value memory;
performing the two previous steps until all blocks have been selected, wherein all atom values corresponding to indexes for the selected kernel function are accumulated; and
selecting another of the kernel functions and performing the step of performing the steps of selecting, retrieving, and accumulating, the step of loading another selected block, and the step of performing the two previous steps until all of the kernel functions have been selected, wherein all atom values, corresponding to indexes from the kernel functions, for the all of the kernel functions are accumulated.

41. The method of claim 35, wherein:
the step of determining, for a particular input vector, a plurality of atom values further comprises the steps of
determining, for a particular input vector, a plurality of atom values corresponding to a first number of atoms, wherein the first number of atoms is larger than a number of dimensions of the atom value memory; and
separating the atoms into blocks, each block comprising the number of dimensions of the atom value memory, but wherein each of the atom values for one atom in each block is zero;
the step of loading a portion of the plurality of atom values into the atom value memory comprises the step of loading a selected one of the blocks into atom value memory;
the step of performing the steps of selecting, retrieving, and accumulating further comprises the steps of:
performing the steps of selecting, retrieving, and accumulating until all indexes for one block of the selected kernel function have been selected;
loading another selected block of atom values into the atom value memory; and
performing the two previous steps until all blocks have been selected, wherein all atom values corresponding to indexes for the selected kernel function are accumulated.

42. The method of claim 35, wherein the step of performing the steps of selecting, retrieving, and accumulating until all indexes corresponding to a selected one of the fixed number of kernel functions have been selected further comprises the steps of performing the steps of selecting and retrieving in parallel for all indexes for the selected kernel function, whereby all atom values corresponding to indexes for the selected kernel function are retrieved in parallel, and performing the step of accumulating after all the atom values have been retrieved.

43. The method of claim 42, wherein the step of accumulating is performed by a pipelined adder chain, and wherein the step of accumulating further comprises the steps of adding one of the retrieved atom values to another of the retrieved atom values and adding a result of all additions for all atom values into an accumulator.

44. The method of claim 42, wherein the step of accumulating is performed by a pipelined tree of adders having a plurality of stages, and wherein the step of accumulating further comprises the steps of performing additions during each stage to add results from a previous stage, wherein the first stage adds a number of the atom values, and adding a result of all additions for all stages into an accumulator.

* * * * *